United States Patent
Song et al.

(10) Patent No.: US 11,671,700 B2
(45) Date of Patent: Jun. 6, 2023

(54) OPERATION CONTROL DEVICE, IMAGING DEVICE, AND OPERATION CONTROL METHOD

(71) Applicant: SONY GROUP CORPORATION, Tokyo (JP)

(72) Inventors: Li Song, Tokyo (JP); Haruka Kawata, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/415,886

(22) PCT Filed: Dec. 4, 2019

(86) PCT No.: PCT/JP2019/047442
§ 371 (c)(1),
(2) Date: Jun. 18, 2021

(87) PCT Pub. No.: WO2020/137398
PCT Pub. Date: Jul. 2, 2020

(65) Prior Publication Data
US 2022/0078337 A1 Mar. 10, 2022

(30) Foreign Application Priority Data
Dec. 27, 2018 (JP) .............................. JP2018-245182

(51) Int. Cl.
*H04N 23/60* (2023.01)
*H04N 23/63* (2023.01)
*H04N 23/67* (2023.01)

(52) U.S. Cl.
CPC ........... *H04N 23/64* (2023.01); *H04N 23/631* (2023.01); *H04N 23/675* (2023.01); *H04N 23/676* (2023.01)

(58) Field of Classification Search
CPC .. G06F 3/04883; G06F 3/0488; G06F 3/0485; G06F 3/0362; G06F 3/038;
(Continued)

(56) References Cited

U.S. PATENT DOCUMENTS 8,970,542 B2 * 3/2015 Murata ............... G06F 3/04883
345/173
10,216,313 B2 * 2/2019 Ichihara ............... G06F 3/04166
(Continued)

FOREIGN PATENT DOCUMENTS

DE 102011107166 A1 1/2012
EP 2816459 A1 12/2014
(Continued)

OTHER PUBLICATIONS

International Search Report and Written Opinion of PCT Application No. PCT/JP2019/047442, dated Mar. 3, 2020, 09 pages of ISRWO.

*Primary Examiner* — Pritham D Prabhakher
(74) *Attorney, Agent, or Firm* — Chip Law Group

(57) ABSTRACT

Provided is an operation control device that includes an operation detection unit that detects a first type operation and a second type operation having an operation area common to the first type operation. The operation control device further includes an operation response processing unit that performs response processing corresponding to the first type operation and the second type operation detected by the operation detection unit, and an operation determination unit that determines whether the second type operation detected by the operation detection unit is a valid operation or an invalid operation in a determination period corresponding to that the operation detection unit has detected the first type operation.

16 Claims, 13 Drawing Sheets

(58) Field of Classification Search
CPC ............... H04N 5/2251; H04N 5/225; H04N 5/232127; H04N 5/232; H04N 5/23222; H04N 5/23216; H04N 5/232933; H04N 5/232133; G03B 15/00; G03B 17/02; G03B 17/00; G03B 17/18
USPC .................................................. 348/207.99
See application file for complete search history.

(56) References Cited

U.S. PATENT DOCUMENTS

| | | | | |
|---|---|---|---|---|
| 10,687,780 | B2 * | 6/2020 | Fukai | G06F 3/048 |
| 10,929,010 | B2 * | 2/2021 | Huang | G06F 3/04847 |
| 11,340,773 | B2 * | 5/2022 | Drake | G06F 3/017 |
| 2009/0061928 | A1 * | 3/2009 | Lee | G06F 3/0362 |
| | | | | 455/556.1 |
| 2010/0321324 | A1 * | 12/2010 | Fukai | G06F 3/048 |
| | | | | 345/173 |
| 2012/0013570 | A1 | 1/2012 | Murata | |
| 2014/0298251 | A1 | 10/2014 | Ohtsuka et al. | |
| 2016/0224179 | A1 * | 8/2016 | Ichihara | H04N 23/62 |
| 2018/0059866 | A1 * | 3/2018 | Drake | G06F 3/0446 |
| 2019/0114067 | A1 * | 4/2019 | Xu | G06F 3/0488 |
| 2019/0155499 | A1 * | 5/2019 | Huang | G06F 3/04883 |
| 2020/0197713 | A1 * | 6/2020 | Clark | A61N 1/36514 |

FOREIGN PATENT DOCUMENTS

| | | |
|---|---|---|
| GB | 2482057 A | 1/2012 |
| JP | 10-133796 A | 5/1998 |
| JP | 2009-252556 A | 10/2009 |
| JP | 2012-022633 A | 2/2012 |
| JP | 2012-190185 A | 10/2012 |
| JP | 2013-168087 A | 8/2013 |
| JP | 2016-122395 A | 7/2016 |
| JP | 2018-067885 A | 4/2018 |
| TW | 367459 B | 8/1999 |
| WO | 2013/122230 A1 | 8/2013 |

* cited by examiner

OPERATION CONTROL DEVICE, IMAGING DEVICE, AND OPERATION CONTROL METHOD

CROSS REFERENCE TO RELATED APPLICATIONS

This application is a U.S. National Phase of International Patent Application No. PCT/JP2019/047442 filed on Dec. 4, 2019, which claims priority benefit of Japanese Patent Application No. JP 2018-245182 filed in the Japan Patent Office on Dec. 27, 2018. Each of the above-referenced applications is hereby incorporated herein by reference in its entirety.

TECHNICAL FIELD

The present technology relates to an operation control device, an imaging device, and an operation control method, and relates particularly to a technique for detecting a user operation.

BACKGROUND ART

There is an operation control device that detects an operation using a control by a user and executes response processing according to the detected operation.

Patent Document 1 below describes, as an example of the operation control device, an imaging device in which an image or a menu screen displayed on a display panel is operated by rotating and pressing a control wheel.

CITATION LIST

Patent Document

Patent Document 1: Japanese Patent Application Laid-Open No. 2018-67885

SUMMARY OF THE INVENTION

Problems to be Solved by the Invention

Incidentally, with a control for receiving various operations using a common area, when the user inputs an operation, another operation signal different from the operation originally intended by the user may be detected, and may lead to an erroneous operation that is not intended by the user.

Therefore, it is an object of the present technology to prevent erroneous operations not intended by the user and to improve operability of the operation control device.

Solutions to Problems

An operation control device according to the present technology includes an operation detection unit that detects a first type operation and a second type operation having an operation area common to the first type operation, an operation response processing unit that performs response processing corresponding to the first type operation and the second type operation detected by the operation detection unit, and an operation determination unit that determines whether the second type operation detected by the operation detection unit is a valid operation or an invalid operation in a determination period corresponding to that the operation detection unit has detected the first type operation.

Thus, in the determination period corresponding to that the first type operation has been detected, it is determined whether or not to execute the response processing corresponding to the second type operation.

In the above-described operation control device according to the present technology, it is conceivable that the second type operation is an operation that has a possibility of being detected by the first type operation.

That is, the second type operation is an operation that may be erroneously operated when the user performs the first type operation.

In the above-described operation control device according to the present technology, it is conceivable that the operation determination unit determines that the second type operation is an invalid operation in the determination period.

Thus, in the determination period corresponding to that the first type operation has been detected, the response processing corresponding to the second type operation is executed, and the response processing corresponding to the second type operation is not executed.

In the above-described operation control device according to the present technology, it is conceivable that the second type operation has a plurality of operation types, and in a case where the second type operation is detected in the determination period, the operation determination unit determines whether the second type operation is a valid operation or an invalid operation according to an operation type.

Thus, in the determination period corresponding to that the first type operation has been detected, it is determined whether or not to execute the response processing corresponding to the second type operation for every type of the second type operation.

In the above-described operation control device according to the present technology, it is conceivable that the determination period is a period from a timing corresponding to the detection of the first type operation to a lapse of a predetermined time.

That is, in a case where the second type operation is detected between the timing corresponding to the detection of the first type operation and the lapse of a predetermined time, it is determined whether or not to execute the response processing corresponding to the second type operation.

In the above-described operation control device according to the present technology, it is conceivable that the determination period is started every time the first type operation is detected.

That is, in a case where the first type operation is detected intermittently, it is determined whether or not to execute the response processing of the second type operation accompanying detection of the second type operation until the determination period corresponding to the detection of the last first type operation ends.

In the above-described operation control device according to the present technology, it is conceivable that the determination period is variably set according to an operating mode.

Thus, the determination period is set corresponding to functions of the first type operation and the second type operation in each operating mode.

In the above-described operation control device according to the present technology, it is conceivable that in a certain operating mode, processing of the operation determination unit is not performed.

Thus, even in the middle of executing the first type operation intermittently, in a case where the second type operation is detected, the response processing corresponding to the second type operation is executed by interruption.

In the above-described operation control device according to the present technology, it is conceivable that, in an operating mode in which an image is displayed according to an operation, the first type operation is an operation to change the displayed image, the second type operation is an operation different from the first type operation, and the operation determination unit determines that the second type operation is an invalid operation in the determination period.

Thus, in the operating mode in which an image is displayed corresponding to an operation, during the determination period corresponding to detection of the operation of changing the displayed image, operations other than the operation of changing the displayed image are not executed.

In the above-described operation control device according to the present technology, it is conceivable that in an operating mode in which it is possible to select a focus area of an imaging device on a display screen, the first type operation is an operation of moving a specified focus area among a plurality of focus areas in one of up-down directions or left-right directions, the second type operation is an operation of moving the specified focus area among the plurality of focus areas in the other of the up-down directions or the left-right directions, and the operation determination unit determines that the second type operation is an invalid operation in the determination period.

Thus, when an operation of sequentially moving the focus area to one side is performed, an operation of moving the focus area to the other side is restricted during the determination period.

In the above-described operation control device according to the present technology, it is conceivable that in an operating mode in which it is possible to select a menu on a display screen, the first type operation is an operation of moving a selection area specified among a plurality of menus in one of up-down directions or left-right directions, the second type operation is an operation of moving the selection area specified among the plurality of menus to one of the other of the up-down directions or the left-right directions, and the operation determination unit determines that the second type operation is an invalid operation in the determination period.

Thus, when the operation of sequentially moving the selection area to one side is performed, the operation of moving the selection area to one side of the other is restricted during the determination period.

In the above-described operation control device according to the present technology, it is conceivable that when a first mode is set in which an image to be reproduced is selected according to an operation, the determination period is set longer than when a second mode is set in which it is possible to select a focus area of an imaging device on a display screen.

In the second mode, it is highly necessary to move the focus area up, down, left, or right quickly so as not to miss a photo opportunity, and thus the determination period is set shorter than in the first mode.

In the above-described operation control device according to the present technology, it is conceivable that the operation detection unit detects the first type operation and the second type operation from a common control.

Since the first type operation and the second type operation are performed by one control, it can be said that there is a high possibility that the second type operation is performed as an erroneous operation of the first type operation.

In the above-described operation control device according to the present technology, it is conceivable that the control is a control wheel, the first type operation is an operation of rotating the control wheel, and the second type operation is an operation of pressing the control wheel.

When performing an operation to rotate the control wheel, the control wheel may be pressed by adjustment of force by the user during the rotating operation of the control wheel, which may be detected as the second type operation.

In the above-described operation control device according to the present technology, it is conceivable that the control is a touch control that detects a contact operation by the user, and the first type operation and the second type operation are contact operations with the touch control, the contact operations having different operation types from each other.

The touch control is detected via a contact operation by the user, and thus there is a possibility that the first type operation is erroneously detected as the second type operation due to an ambiguous operation by the user.

An imaging device according to the present technology includes the above-described operation detection unit, operation response processing unit, and operation determination unit.

An operation control method according to the present technology is an imaging method including, by an operation control device, detecting a first type operation and a second type operation having an operation area common to the first type operation and performing response processing corresponding to the first type operation and the second type operation detected, and determining whether the detected second type operation is a valid operation or an invalid operation in a determination period corresponding to that the first type operation has been detected.

MODE FOR CARRYING OUT THE INVENTION

Hereinafter, embodiments will be described in the following order.

<1. Configuration of imaging device>
<2. First embodiment>
<3. Second embodiment>
<4. Summary and modification example>
<5. Application example>

1. Configuration of Imaging Device

In an embodiment, an example in which an operation control device is built in an imaging device will be described.

Figure 1:
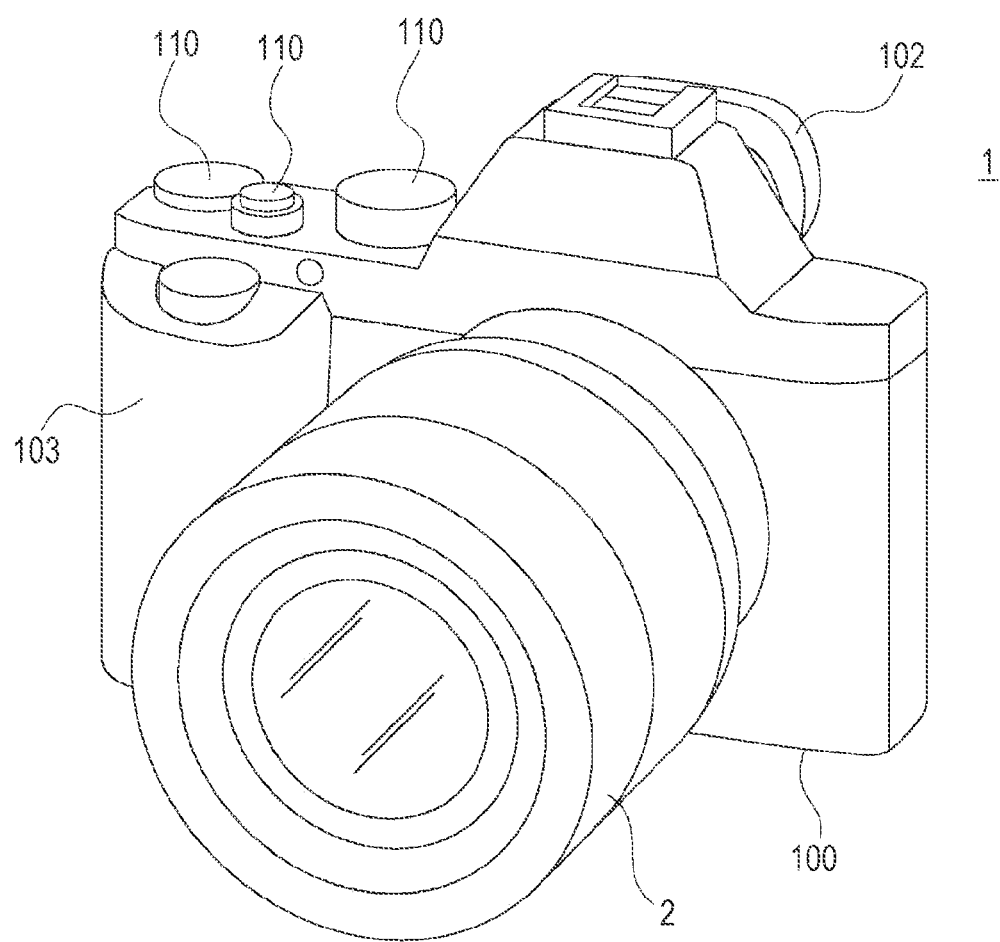
FIG. 1 is a perspective view of an appearance of an imaging device of an embodiment of the present technology.
Figure 2:
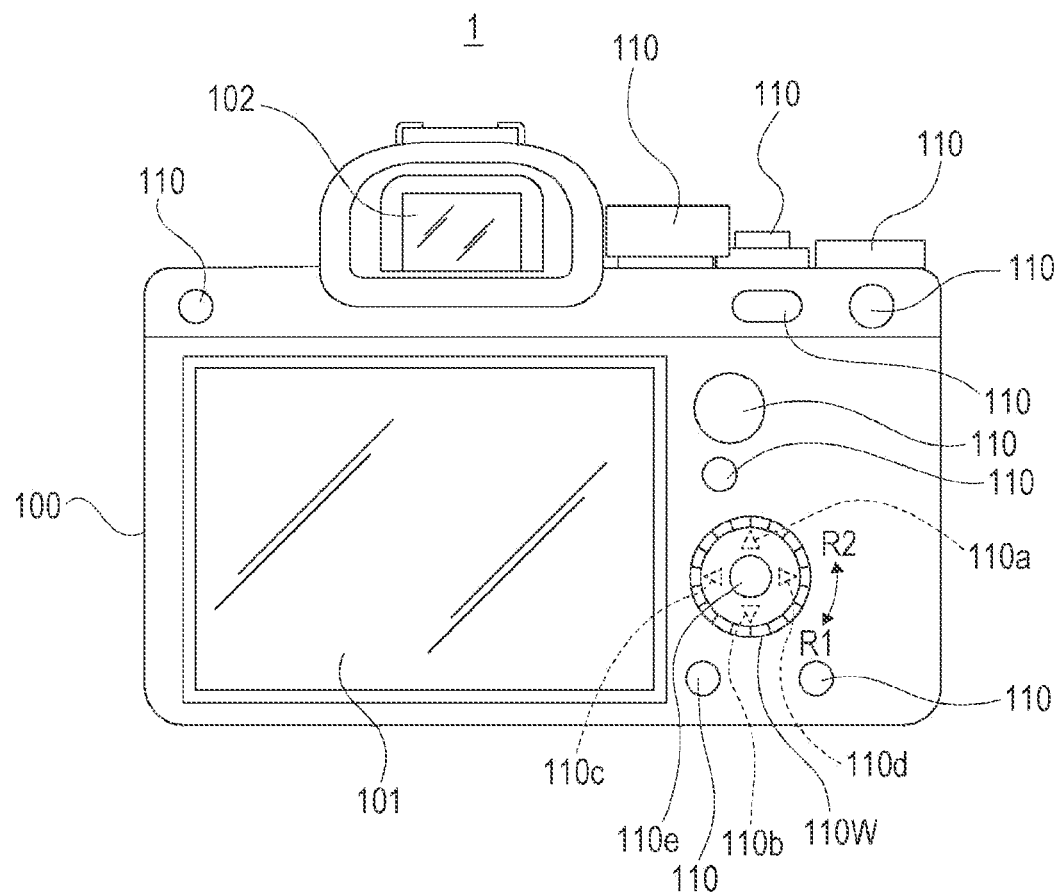
FIG. 2 is a rear view of the imaging device of the embodiment.

FIG. 1 illustrates a perspective view from a front of the imaging device 1 of the embodiment, and FIG. 2 illustrates a rear view. Here, the imaging device 1 is what is called a digital still camera, and by switching an imaging mode, both imaging of a still image and imaging of a moving image can be performed.

Note that in the present embodiment, the imaging device 1 is not limited to the digital still camera, and may be a video camera that is mainly used for imaging a moving image and is also capable of imaging a still image.

In the imaging device 1, a lens barrel 2 is arranged on a front side of a main body housing 100 constituting a camera main body, or is detachable.

On a back side (user side) of the imaging device 1, for example, a display panel 101 including a display device such as a liquid crystal display (LCD) or an organic electro-luminescence (EL) display is provided.

Furthermore, as a viewfinder 102, a display unit formed by using an LCD, an organic EL display, or the like is also provided.

The user can visually recognize an image and various information by the display panel 101 and the viewfinder 102.

In this example, the imaging device 1 is provided with both the display panel 101 and the viewfinder 102 but is not limited thereto, and may be provided with only one of the display panel 101 and the viewfinder 102, or with both or one of the display panel 101 and the viewfinder 102 being detachable.

Various controls 110 are provided on the main body housing 100 of the imaging device 1.

For example, as the control 110, various forms such as a key, a dial, and a combined press-rotation control are provided to achieve various operation functions. For example, menu operation, shutter operation (release operation), reproduction operation, mode selection operation, focus operation, zoom operation, parameter selection operation for such as shutter speed and F value (F-number), and the like can be performed. Although details of each of the controls 110 are omitted, in the case of the present embodiment, a control wheel 110W is particularly illustrated among the controls 110.

The control wheel 110W is operated when performing an operation on an image, a menu screen, or the like displayed on the display panel 101.

The control wheel 110W is a combined press-rotating control that can be rotated in R1 and R2 directions in the view, and for example, depending on the rotation, it is operated when image forwarding is performed on a view screen for a captured image, when a focus area on a focus screen during imaging is moved up, down, left, or right, or when a cursor or the like is moved up, down, left, or right on the menu screen.

Hereinafter, the rotation directions of the control wheel 110W will be described with the R1 direction being a clockwise direction and the R2 direction being a counter-clockwise direction in a state where the imaging device 1 is viewed from the rear.

The control wheel 110W functions as buttons 110a, 110b, 110c, and 110d for receiving a pressing operation at each of triangular marks indicated by dotted lines in the view, and receives cursor movement, image forwarding operation of captured images, and the like.

Furthermore, it is possible to assign functions for implementing various settings to the buttons 110a, 110b, 110c, and 110d. The buttons 110a, 110b, 110c, and 110d are assigned various functions according to the operating mode.

A button 110e for receiving a pressing operation is provided in a center of the control wheel 110W, and functions as an enter key (decision button) for deciding a selection when, for example, a menu screen or the like is displayed.

Figure 3:
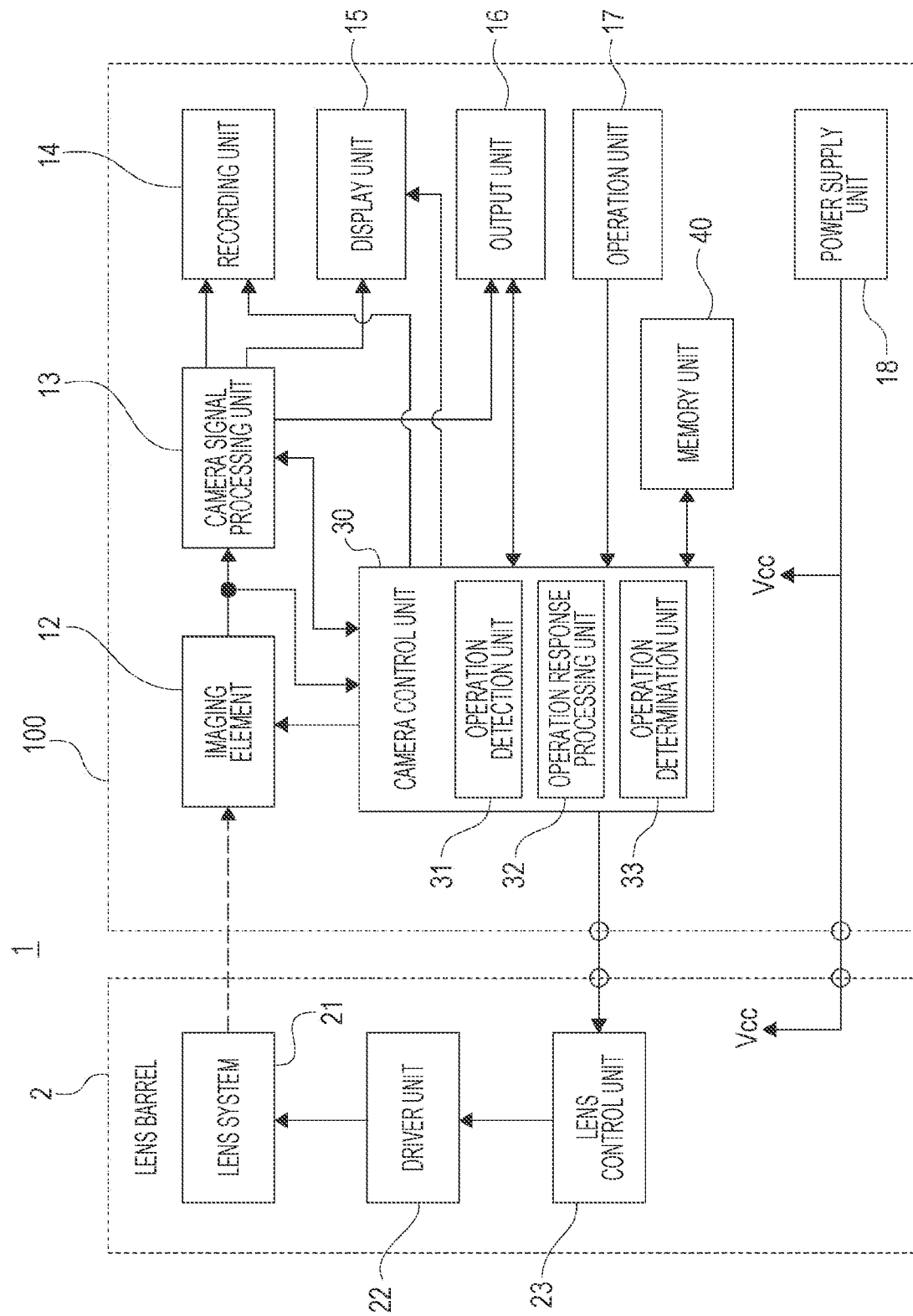
FIG. 3 is a block diagram of an internal configuration of an imaging device according to the embodiment.

FIG. 3 illustrates an internal configuration of the imaging device 1 including the lens barrel 2. Note that here an example in which the imaging device 1 is divided into the main body housing 100 and the lens barrel 2 will be described, but the part corresponding to the lens barrel 2 may be integrated with the main body housing 100.

The imaging device 1 has an imaging element (imaging element) 12, a camera signal processing unit 13, a recording unit 14, a display unit 15, an output unit 16, an operation unit 17, a power supply unit 18, a camera control unit 30, and a memory unit 40 in the main body housing 100.

Furthermore, the lens barrel 2 has a lens system 21, a driver unit 22, and a lens control unit 23.

The lens system 21 in the lens barrel 2 includes a lens such as a cover lens, a zoom lens, and a focus lens, and an aperture (iris) mechanism. Light from a subject (incident light) is guided by the lens system 21 and is focused on the imaging element 12 in the imaging device 1.

The imaging element 12 is configured as, for example, a charge coupled device (CCD) type, a complementary metal oxide semiconductor (CMOS) type, or the like.

The imaging element 12 executes, for example, correlated double sampling (CDS) processing, automatic gain control (AGC) processing, or the like on an electric signal obtained by photoelectric conversion of the received light, and further performs analog/digital (A/D) conversion processing. Then, an imaging signal as digital data is output to the camera signal processing unit 13 and the camera control unit 30 in a subsequent stage.

The camera signal processing unit 13 is configured as, for example, an image processor with a digital signal processor (DSP) or the like. This camera signal processing unit 13 performs various signal processing on a digital signal (captured image signal) from the imaging element 12. For example, the camera signal processing unit 13 performs preprocessing, simultaneous processing, YC generation processing, resolution conversion processing, codec processing, or the like.

In the preprocessing, clamping processing of clamping black levels of R, G, and B to a predetermined level, correction processing among color channels of R, G, and B, or the like is performed on the captured image signal from the imaging element 12.

In the simultaneous processing, demosaic processing is performed so that image data for each pixel has all color components of R, G, and B.

In the YC generation processing, a luminance (Y) signal and a color (C) signal are generated (separated) from image data of R, G, and B.

In the resolution conversion processing, the resolution conversion processing is executed on image data subjected to various signal processing.

In the codec processing, resolution-converted image data is encoded, for example, for recording or communication.

The recording unit 14 includes, for example, a non-volatile memory, and stores image files (content files) such as still image data and moving image data, attribute information of the image files, thumbnail images, and the like.

Image files are stored in formats such as Joint Photographic Experts Group (JPEG), Tagged Image File Format (TIFF), or Graphics Interchange Format (GIF), for example.

The actual form of the recording unit 14 can be considered in various ways. For example, the recording unit 14 may be a flash memory built in the imaging device 1, or have a form having a memory card (for example, a portable flash memory) that can be attached to and detached from the imaging device 1, and a card recording-reproduction unit that performs recording-reproduction access to the memory card. Furthermore, it may be implemented as a hard disk drive (HDD) or the like as a form built in the imaging device 1.

The display unit 15 is a display unit that displays various displays to the imaging person, and specifically indicates the display panel 101 and the viewfinder 102 illustrated in FIG. 2.

The display unit 15 executes various displays on the display screen on the basis of an instruction of the camera control unit 30. For example, the display unit 15 displays a reproduced image of image data read from a recording medium by the recording unit 14. Furthermore, the display unit 15 is supplied with image data of a captured image subjected to resolution conversion for display by the camera signal processing unit 13. The display unit 15 displays what is called a through image (subject monitoring image), which is an image captured during release standby, by displaying on the basis of image data of a captured image in response to an instruction from the camera control unit 30.

Furthermore, the display unit 15 causes display of various operation menus, icons, messages, and the like, that is, display as a graphical user interface (GUI) to be executed on the screen on the basis of instructions of the camera control unit 30.

The output unit 16 performs data communication and network communication with an external device by wire or wirelessly.

For example, captured image data (still image file or moving image file) is transmitted and output to an external display device, recording device, reproduction device, or the like.

Furthermore, assuming that it is a network communication unit, for example, the output unit 16 may communicate with various networks such as the Internet, a home network, and a LAN (Local Area Network), and transmits and receives various data to and from a server, a terminal, and the like on the network.

The operation unit 17 collectively illustrates an input device for the user to perform various operation inputs. Specifically, the operation unit 17 indicates various controls 110 (including the control wheel 110W and the buttons 110a, 110b, 110c, and 110d) provided on the main body housing 100.

The operation unit 17 detects an operation by the user, and a signal corresponding to the input operation is sent to the camera control unit 30.

As the operation unit 17, a touch panel may be used as the control 110. For example, a touch panel may be formed on the display panel 101, and various operations may be possible by operating the touch panel using icons, menus, and the like to be displayed on the display panel 101.

Alternatively, the operation unit 17 may also have a mode of detecting a tap operation or the like by the user with a touch pad or the like.

Moreover, the operation unit 17 may be configured as a reception unit of an external operation device such as a separate remote controller.

The power supply unit 18 generates a power supply voltage Vcc needed for each unit from, for example, a battery loaded inside, and supplies it as an operating voltage.

When the lens barrel 2 is attached to the imaging device 1, the power supply voltage Vcc by the power supply unit 18 is also supplied to a circuit inside the lens barrel 2.

Note that in the power supply unit 18, a circuit that charges the battery or a circuit that generates the power supply voltage Vcc may be formed, using a DC voltage converted and input by an AC adapter connected to a commercial AC power supply as the power supply.

The camera control unit 30 includes a microcomputer (arithmetic processing unit) equipped with a central processing unit (CPU).

The memory unit 40 stores information and the like used for processing by the camera control unit 30. The illustrated memory unit 40 comprehensively indicates, for example, a read only memory (ROM), a random access memory (RAM), a flash memory, and the like.

The memory unit 40 may be a memory area built in the microcomputer chip as the camera control unit 30, or may include a separate memory chip.

The camera control unit 30 controls the entire imaging device 1 and the lens barrel 2 by executing a program stored in the ROM of the memory unit 40, the flash memory, or the like.

For example, the camera control unit 30 controls operation of each necessary part for controlling shutter speed of the imaging element 12, instructing various signal processing in the camera signal processing unit 13, imaging operation and recording operation according to an operation by the user, reproduction operation of a recorded image file, operation of the lens system 21 such as zoom, focus, and aperture adjustment in the lens barrel 2, operation of the user interface, and the like. Regarding the aperture adjustment, the camera control unit 30 performs variable control of F value according to the user operation and an instruction of the F value as automatic control (auto iris).

The RAM in the memory unit 40 is used for temporarily storing data, programs, and the like as a work area for various data processing of the CPU of the camera control unit 30.

The ROM and the flash memory (non-volatile memory) in the memory unit 40 are used for storing an operating system (OS) for the CPU to control each unit, content files such as image files, application programs for various operations, and firmware, and the like.

When the lens barrel 2 is attached to the main body housing 100, the camera control unit 30 communicates with the lens control unit 23 and gives various instructions.

The lens barrel 2 is equipped with, for example, a lens control unit 23 with a microcomputer, and various data communication with the camera control unit 30 is possible. In a case of the present embodiment, the camera control unit 30 gives drive instructions for the zoom lens, the focus lens, the aperture mechanism, and the like to the lens control unit 23. The lens control unit 23 controls the driver unit 22 in response to these drive instructions to execute operation of the lens system 21.

Note that in a state where the lens barrel 2 is attached to the main body housing 100, the camera control unit 30 and the lens control unit 23 are configured to execute wired communication. However, the camera control unit 30 and the lens control unit 23 may be capable of performing wireless communication.

The driver unit 22 is provided with, for example, a motor driver for a zoom lens drive motor, a motor driver for a focus lens drive motor, a motor driver for a diaphragm mechanism motor, and the like.

In these motor drivers, a drive current is applied to the corresponding driver in response to an instruction from the lens control unit 23 to perform moving the focus lens and zoom lens, opening and closing diaphragm blades of the diaphragm mechanism, and the like.

Next, the function of the camera control unit 30 for performing operation of the present embodiment will be described.

As the functions of the camera control unit 30, an operation detection unit 31, an operation response processing unit 32, and an operation determination unit 33 are provided as functions for recognizing a user operation using the control wheel 110W.

As an example for description, it is assumed that these functions are provided in the camera control unit 30 by software, but a part or all of these functions may be provided in the DSP or the microcomputer used as, for example, the camera signal processing unit 13 and the like, or may be provided in another part such as a microcomputer of a chip different from the camera control unit 30 and the camera signal processing unit 13. In any case, it is sufficient if a configuration for performing these functions is provided in the imaging device 1.

The operation detection unit 31 detects a first type operation and a second type operation having an operation area common to the first type operation. The second type operation is an operation that may be detected by the first type operation.

In the embodiment, the control wheel 110W, which is a control, is assumed as an operation area, an operation of rotating the control wheel 110W in the R1 direction and the R2 direction will be described as the first type operation, and an operation of pressing one of the buttons 110a, 110b, 110c, and 110d of the control wheel 110W will be described as the second type operation.

Note that as a control, it is a touch control such as a touch panel that detects a touch operation by the user, and for example, the first type operation may be an operation of tracing in a circular shape on the touch panel, and may be an operation of sliding on the second type operation touch panel.

The operation response processing unit 32 performs response processing corresponding to the first type operation and the second type operation detected by the operation detection unit 31. Here, the response processing means processing associated with an operation of each of the first type operation and the second type operation, and the operation response processing 32 executes response processing associated with an operation detected by the operation detection unit 31.

For every operating mode in the imaging device 1, each of response processing corresponding to detection of the first type operation and response processing corresponding to detection of the second type operation is assigned to every operation. In the embodiment, the response processing corresponding to detection of a pressing operation is assigned to each of rotations of the control wheel 110W in the R1 direction or the R2 direction for the first type operation, and to each of the buttons 110a, 110b, 110c, and 110d in the second type operation.

Note that a correspondence between the first type operation and the second type operation and the response processing may be stored in the imaging device 1 in advance, or may be variably set later by a setting operation by user.

An example of a specific correspondence between the first type operation and the second type operation and the response processing will be described later.

The operation determination unit 33 determines whether the operation detection unit 31 is a valid operation or an invalid operation for the second type operation detected by the operation detection unit 31 during a determination period corresponding to detection of the first type operation. Here, the determination period means a period from a timing corresponding to detection of the first type operation until a lapse of a predetermined time. The length of the determination period in a case where a rotation of the control wheel 110W is assumed as the first type operation is set, for example, between 100 msec and 300 msec. This is for not making the user feel discomfort about a state that the second type operation is not accepted.

If the operation determination unit 33 determines that the second type operation is a valid operation during the determination period, the operation response processing unit 32 executes the response processing associated with the second type operation.

2. First Embodiment

An example of processing performed in the imaging device 1 having the above configuration will be described with reference to FIGS. 4A, 4B, 4C, 4D, 4E, 4F, 5A, 5B, 5C, 5D, 6, 7, and 8.

In the embodiment, as an example, a case where the operating mode of the imaging device 1 is a viewing mode in which a captured image is displayed on the display unit 15 according to an operation will be described. Here, the captured image will be described as a still image captured by the user using the imaging device 1.

Note that the captured image is not limited to a still image and may be a moving image, and is not limited to an image captured using the imaging device 1 and may be, for example, image data received from another device.

In the viewing mode, among the first type operations, the operation of rotating the control wheel 110W in the R1 direction is assigned an image forwarding operation to display the next image of the image displayed on the display unit 15 as response processing, and the operation of rotating the control wheel 110W in the R2 direction is assigned an image returning operation to return from the image displayed on the display unit 15 to display the previous image as response processing.

Furthermore, among the second type operations, a screen display switching function is assigned to the button 110a, a function for setting volume is assigned to the button 110b, a function for setting exposure correction is assigned to the button 110c, and a function for setting a flash mode is assigned to the button 110d.

The screen forwarding operation of the captured image displayed on the display unit 15 by the rotating operation of the control wheel 110W will be described with reference to FIGS. 4A, 4B, 4C, 4D, 4E, and 4F. FIGS. 4A, 4B, 4C, 4D, 4E, and 4F illustrate captured images stored in the memory unit 40 displayed on the display unit 15, respectively. Furthermore, FIGS. 4A and 4F, FIGS. 4B and 4E, and FIGS. 4C and 4D are the same captured images, respectively.

Figure 4A:
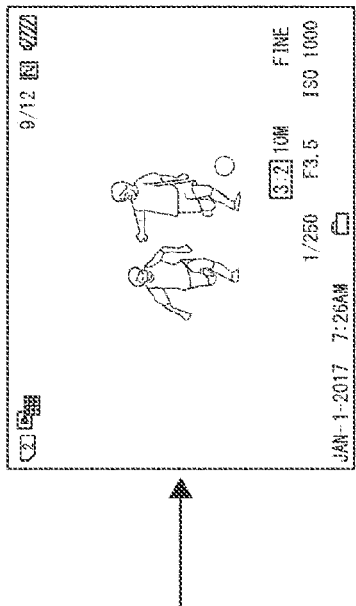
FIGS. 4A, 4B, 4C, 4D, 4E, and 4F are explanatory diagrams of a display example of a screen according to an operation of the embodiment.
Figure 4B:
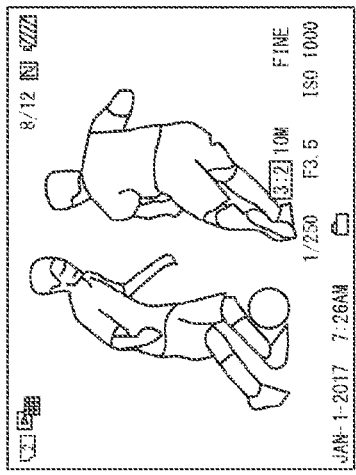
Figure 4C:
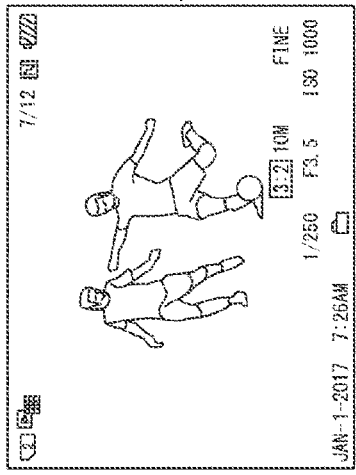

First, if the camera control unit 30 detects an operation of rotating the control wheel 110W in the R1 direction while the captured image of FIG. 4A is displayed on the display unit 15, image forwarding is performed from FIG. 4A to the captured image of FIG. 4B, and the captured image of FIG. 4B is displayed on the display unit 15. Then, if the camera control unit 30 detects the operation of rotating the control wheel 110W in the R1 direction again, image forwarding is performed on the display unit 15 from FIG. 4B to the captured image of FIG. 4C.

Figure 4D:
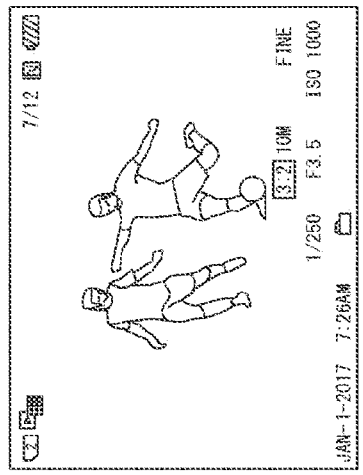
Figure 4E:
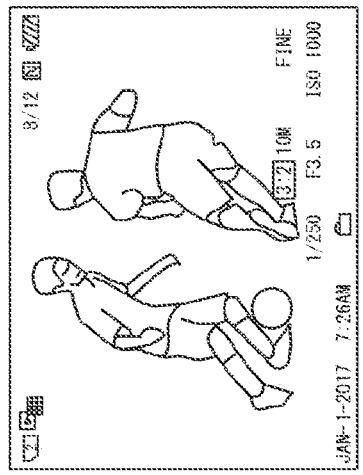
Figure 4F:
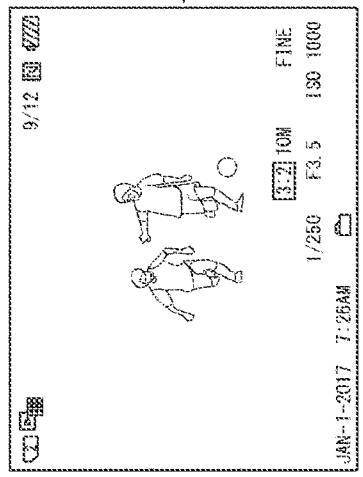

Furthermore, if the camera control unit 30 detects an operation of rotating the control wheel 110W in the R2 direction in a state where the captured image of FIG. 4D is displayed on the display unit 15, image forwarding is performed from FIG. 4D to the captured image of FIG. 4E, that is, in the direction opposite to that when operating to rotate in the R1 direction, and the captured image of FIG. 4E is displayed on the display unit 15. Then, if the camera control unit 30 detects the operation of rotating the control wheel 110W in the R2 direction again, image forwarding is performed on the display unit 15 from FIG. 4E to the captured image of FIG. 4F.

In this manner, the user can sequentially display the captured images stored in the imaging device 1 on the display unit 15 by performing the operation of rotating the control wheel 110W in the R1 direction or the R2 direction.

Here, in some cases, depending on adjustment of force applied by the user to rotate the control wheel 110W in the R1 direction or the R2 direction, the camera control unit 30 may detect it as a pressing operation on any of the buttons 110a, 110b, 110c, and 110d.

Figure 5A:
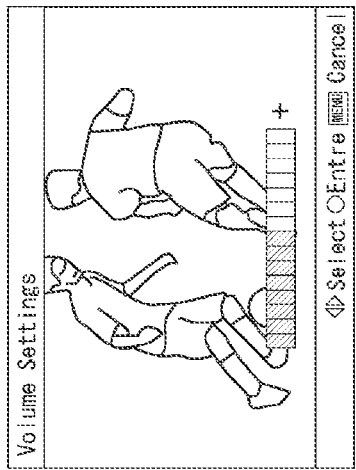
FIGS. 5A, 5B, 5C, and 5D are explanatory diagrams of a display example of a screen according to an operation of the embodiment.
Figure 5B:
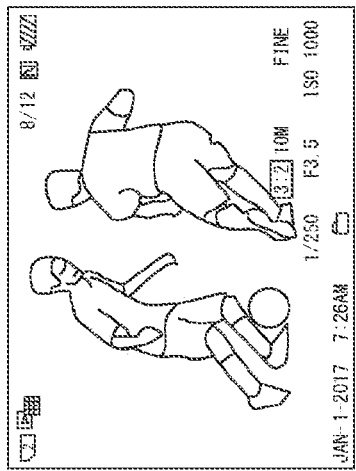

For example, as illustrated in FIGS. 5A, 5B, 5C, and 5D, by the camera control unit 30 detecting the operation of rotating the control wheel 110W in the R1 direction by the user, image forwarding is performed as response processing, and the captured image displayed on the display unit 15 (FIG. 5A) is switched to the next captured image (FIG. 5B).

At this time, in a case where the screen forwarding is further performed from the captured image (FIG. 5B) to the next captured image (FIG. 4C), the captured image (FIG. 5B) displayed on the display unit 15 has to be switched to the next captured image (FIG. 4C) as response processing of the next rotating operation detected sequentially by continuously rotating the control wheel 110W in the R1 direction.

However, in the sequential rotating operation of the control wheel 110W, if a pressing operation of one of the buttons 110a, 110b, 110c, and 110d is detected during a period from detection of a certain rotating operation to detection of a next rotating operation by the camera control unit 30, the response processing for the pressing operation of the buttons 110a, 110b, 110c, and 110d is executed.

For example, it is assumed that, in a state where the captured image (FIG. 5A) displayed on the display unit 15 is screen-forwarded to the captured image (FIG. 5B) by the sequential rotating operation of the control wheel 110W, the pressing operation of the button 110b is detected before the camera control unit 30 detects the next rotating operation.

Figure 5C:
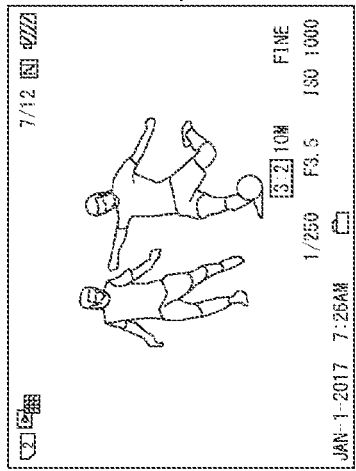

In this case, the captured image (FIG. 5B) displayed on the display unit 15 is not screen-forwarded to the captured image (FIG. 4C), and the screen for setting the volume is displayed in a state of overlapping with the captured image (FIG. 5B) as response processing of the pressing operation of the button 110b (FIG. 5C).

Furthermore, it is assumed that, in a state where the captured image (FIG. 5A) displayed on the display unit 15 is screen-forwarded to the captured image (FIG. 5B) by the sequential rotating operation of the control wheel 110W, the pressing operation of the button 110a is detected before the camera control unit 30 detects the next rotating operation.

Figure 5D:
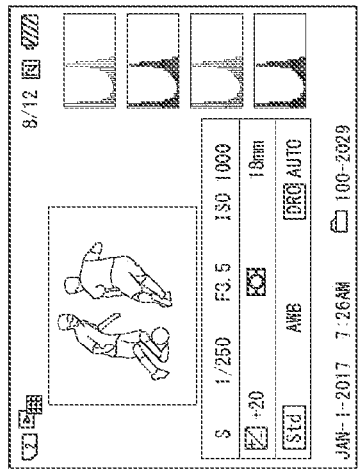

In this case, the captured image (FIG. 5B) displayed on the display unit 15 is not screen-forwarded to the captured image (FIG. 4C), and a process of switching the screen display is executed as response processing of the pressing operation of the button 110a. By switching the screen display, the captured image (FIG. 5B) is reduced and displayed, and various setting states are displayed. For example, in addition to displaying ISO sensitivity, exposure value, aperture value, shutter speed, imaging date and time, aspect ratio, battery level, and the like, a graph illustrating the brightness and darkness of the image, a spirit level showing a horizontal tilt as an index, and the like are displayed. (FIG. 5D).

In this manner, by detecting an erroneous operation not intended by the user when the rotating operation of the control wheel 110W is sequentially performed, it is possible that the sequential image forwarding operation is interrupted in the middle, and the operation intended by the user is not performed smoothly.

Accordingly, in the present technology, a determination period is provided for determining, as an invalid operation, the second type operation that may be erroneously operated when performing the first type operation intended by the user, to thereby prevent the operation originally intended by the user from being interrupted by an erroneous operation not intended by the user.

Figure 6:
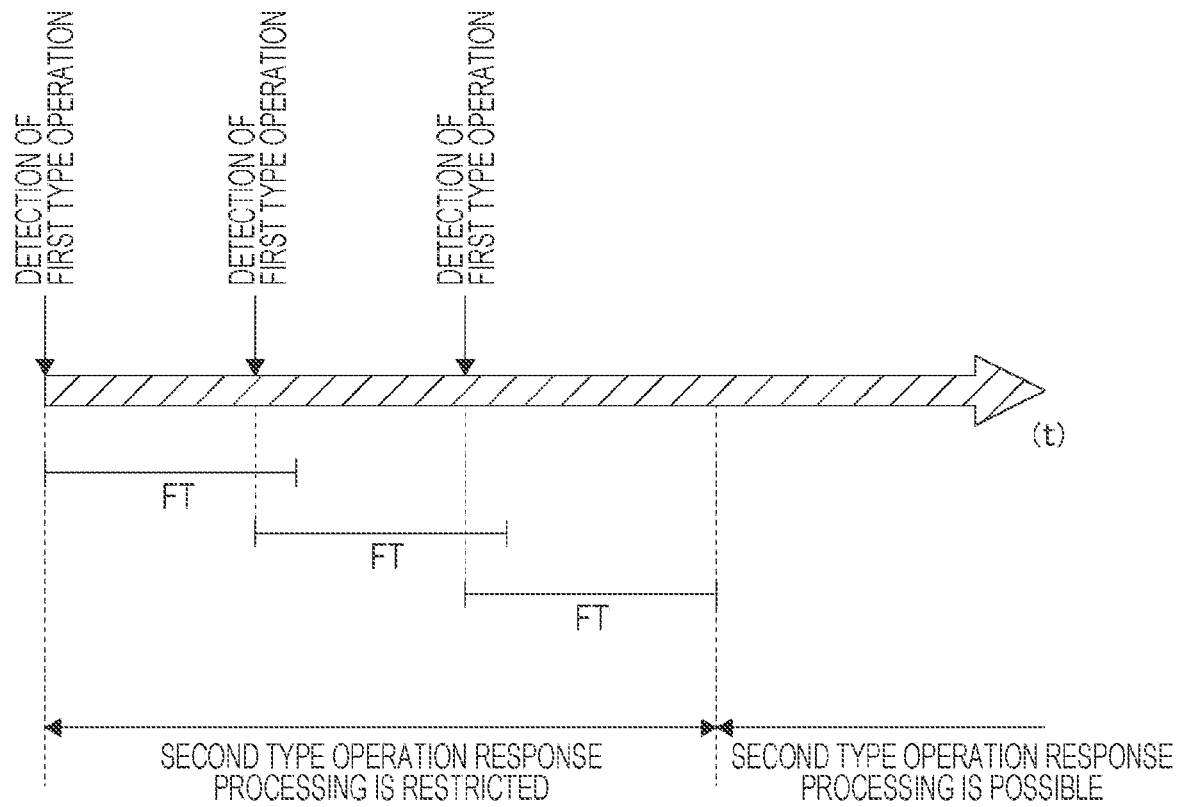
FIG. 6 is an explanatory diagram of a determination period of the embodiment.

Here, a determination period FT corresponding to detection of the first type operation in the present technology will be described with reference to FIG. 6.

In a case where the user sequentially performs a rotating operation (first type operation) of the control wheel 110W, the camera control unit 30 intermittently detects the rotating operation at a predetermined timing. In the embodiment, the camera control unit 30 detects a pulse signal by the rotating operation (first type operation) at intervals of about 150 msec to 200 msec according to a rotating operation speed by the user, or the like.

The camera control unit 30 starts the determination period FT from a timing when it is determined that the rotating operation (first type operation) of the control wheel 110W is being performed. In the embodiment, the determination period FT is 250 msec.

In the determination period FT, the camera control unit 30 determines that a pressing operation (second type operation) of the buttons 110a, 110b, 110c, and 110d is an invalid operation. Thus, the response processing (second type operation response processing) executed when the camera control unit 30 determines that the second type operation is a valid operation is restricted.

In a case where the second type operation is detected after the determination period FT has elapsed, the camera control unit 30 determines that the second type operation is a valid operation, and executes the second type operation response processing.

As described above, it is possible to smoothly execute the response processing (first type operation response processing) by the first type operation that is sequentially performed.

Figure 7:
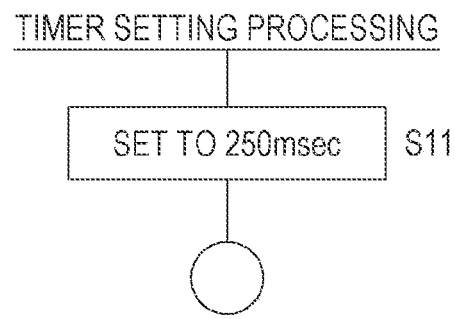
FIG. 7 is a flowchart of a processing example of a first embodiment.
Figure 8:
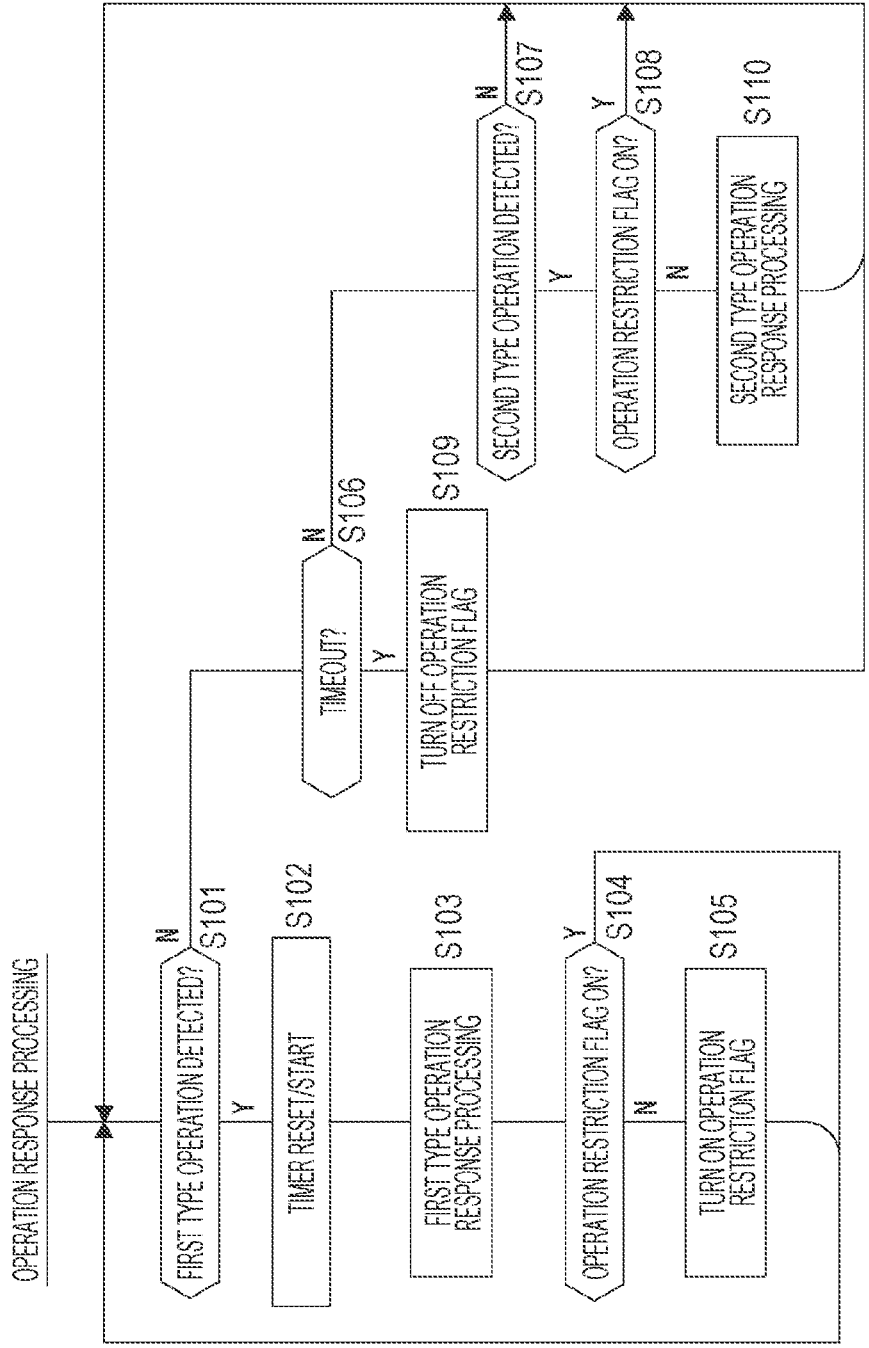
FIG. 8 is a flowchart of a processing example of the first embodiment.

FIGS. 7 and 8 illustrate an example of processing as the first embodiment. This process is executed by the camera control unit 30 by the function illustrated in FIG. 3.

FIGS. 7 and 8 illustrate processing of the camera control unit 30 in response to the rotating operation (first type operation) of the control wheel 110W and the pressing operation (second type operation) of the buttons 110*a*, 110*b*, 110*c*, and 110*d*.

First, the camera control unit 30 sets the determination period FT to 250 msec in step S11 of FIG. 7, and ends a timer setting process. The determination period FT is not limited to 250 msec and it is sufficient if the user does not feel any discomfort during operation, and various periods can be set The timer setting process may be executed as initial setting when the power of the imaging device 1 is turned on. Furthermore, the value of the timer may be fixed in advance.

Next, the operation response processing in the first embodiment will be described with reference to FIG. 8.

The camera control unit 30 repeats the processes of steps S101, S106, and S107 in FIG. 8 as a monitoring loop, to thereby monitor the rotating operation (first type operation) of the control wheel 110W and the pressing operation (second type operation) of the buttons 110*a*, 110*b*, 110*c*, and 110*d*.

If the camera control unit 30 detects that the user has performed a rotating operation (first type operation) of the control wheel 110W, the camera control unit 30 advances the process from step S101 to step S102, the timer is reset, and then the 250 msec timer set as the determination period FT is started.

Then, in step S103, the camera control unit 30 executes the first type operation response processing corresponding to the rotating operation (first type operation) of the control wheel 110W. Here, the first type operation response processing is, for example, a process of switching the captured image (FIG. 4A) displayed on the display unit 15 to the captured image (FIG. 4B) by image forwarding.

Thereafter, the camera control unit 30 checks whether or not an operation restriction flag is on in step S104. The operation restriction flag is a flag indicating whether or not it is currently in the determination period FT, in a case where it is in the determination period FT, the operation restriction flag is turned on, and in a case where it is not in the determination period FT, the operation restriction flag is turned off.

In a case where the operation restriction flag is off in step S104, the camera control unit 30 advances the process from step S104 to step S105 and turns on the operation restriction flag. The determination period FT is started by turning on the operation restriction flag.

The camera control unit 30 returns to the monitoring loop after turning on the operation restriction flag in step S105.

Furthermore, in a case where the camera control unit 30 detects the rotating operation (first type operation) of the control wheel 110W again after the determination period FT is started, the camera control unit 30 advances the process from step S101 to step S102, the timer is reset, and thereafter the 250 msec timer set as the determination period FT is started again.

If the first type operation response processing is executed in step S103, the camera control unit 30 advances the process to step S104 and determines whether the operation restriction flag is on.

This time, since the determination period FT has been set again during the determination period FT, the operation restriction flag is still on. Therefore, the camera control unit 30 returns to the monitoring loop after step S104.

If the pressing operation (second type operation) of any of the buttons 110*a*, 110*b*, 110*c*, and 110*d* is detected in the monitoring loop, the camera control unit 30 advances the process from step S107 to step S108 to check if the operation restriction flag is turned on. That is, the camera control unit 30 checks whether or not it is currently in the determination period FT.

After the first type operation is detected in step S101, the operation restriction flag is turned on in step S105, and thus the camera control unit 30 returns the process to the monitoring loop from step S108 without executing the process (second type operation response processing) corresponding to the pressing operation (second type operation) of any of the buttons 110*a*, 110*b*, 110*c*, and 110*d* in step S110. That is, the detected second type operation is determined to be an invalid operation.

In the monitoring loop, in a case where 250 msec elapses after the detection of the first type operation in step S101 and the timer started in step S102 times out, the camera control unit 30 advances the process from step S106 to step S109, and turns off the operation restriction flag. Thus, the determination period FT corresponding to the detection of the first type operation ends.

This is, for example, when the sequential rotating operation (first type operation) of the control wheel 110W finishes. In a case where the control wheel 110W is sequentially operated, the first type operation is intermittently detected in step S101 and thus the timer is reset and started in step S102 to continue the determination period FT, but if the sequential operation of the control wheel 110W is finished, the first type operation is not detected in step S101, and thus 250 msec elapses without resetting and starting the timer in step S102 and the determination period FT ends.

In this state, if the camera control unit 30 detects the second type operation in step S107, since the operation restriction flag is off, the camera control unit 30 advances the process in the order of steps S107, S108, and S110, and the process (second type operation response processing) corresponding to the pressing operation (second type operation) of any of the buttons 110*a*, 110*b*, 110*c*, and 110*d* is executed in step S110. That is, the detected second type operation is determined to be a valid operation.

Specifically, the screen display is switched according to the pressing operation of the button 110*a*, a screen for setting the volume is displayed according to the pressing operation of the button 110*b*, a screen for setting the exposure correction is displayed according to the pressing operation of the button 110*c*, or a screen for setting the flash mode is displayed according to the pressing operation of the button 110*d*.

By executing the processing described above, the camera control unit 30 restricts the second type operation for a predetermined time after the first type operation, and thus the sequential first type operation can be prevented from being interrupted by the second type operation.

Note that in the embodiment, the camera control unit 30 detects the second type operation in step S107 and then checks the operation restriction flag in step S108, but it may be configured not to detect the second type operation during the period in which the operation restriction flag is on, that is, during the determination period FT corresponding to the first type operation.

For example, the camera control unit 30 may check whether or not the operation restriction flag is on before step S107, and execute a process of determining whether the second type operation is detected in step S107 only when the operation restriction flag is off. In this case, in a case where the operation restriction flag is on, the camera control unit 30 returns to the monitoring loop without determining whether the second type operation is detected in step S107.

3. Second Embodiment

A processing and display example of the second embodiment will be described with reference to FIGS. 9A, 9B, 9C, 10A, 10B, 10C, 11, and 12.

In the first embodiment, the case where the operating mode of the imaging device 1 is the viewing mode has been described, but the operating mode of the imaging device 1 has various operating modes in addition to the viewing mode.

Furthermore, because each operating mode has a different role, it is necessary to set the determination period FT corresponding to the first type operation and the second type operation to be restricted accordingly.

Accordingly, in the second embodiment, the processing performed in the imaging device 1 in a case where a plurality of operating modes is provided will be described.

Here, as an example of the operating mode, in addition to the viewing mode described in the first embodiment, it will be described using a magnified focus mode in which the focus area of the imaging device 1 can be selected on the display screen and a menu mode in which a menu can be selected on the display screen.

Note that in the following description, an up-down direction and a left-right direction indicate directions when the imaging device 1 is viewed from a rear surface.

First, the magnified focus mode will be described with reference to FIGS. 9A, 9B, and 9C.

Figure 9:
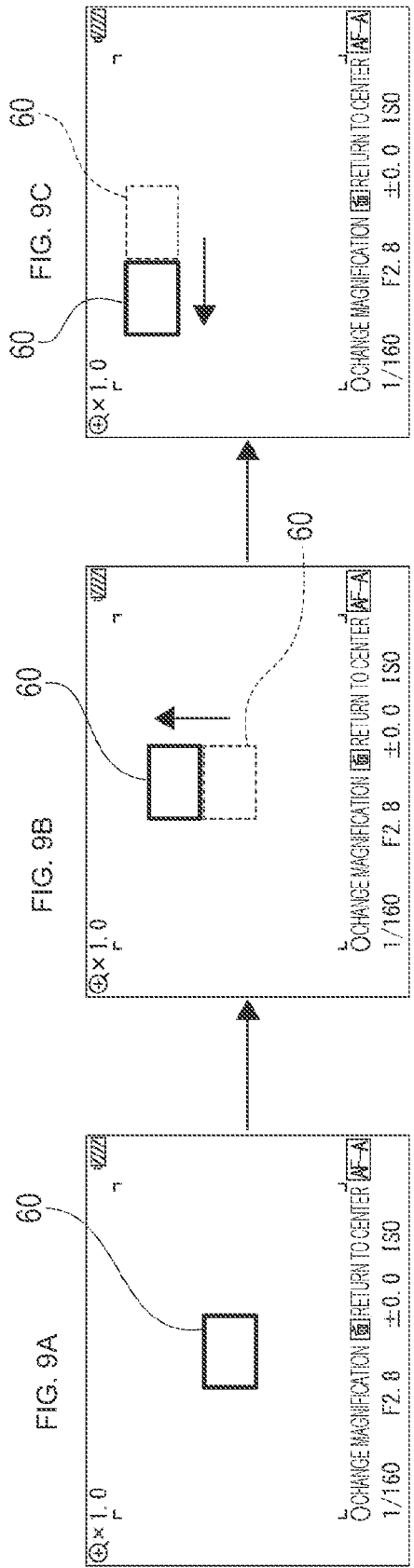
FIGS. 9A, 9B and 9C are explanatory diagrams of a focus area display example of the embodiment.

The magnified focus mode is a mode such that the focus area 60 is displayed in the center of the display screen on the display unit 15 as illustrated in FIG. 9A by a half press of the shutter button or the like, and magnified focus can be performed on a subject in the focus area 60.

In the magnified focus mode, among the first type operations, the operation of rotating the control wheel 110W in the R1 direction is assigned an operation of moving the focus area 60 in a down direction on the display screen, and the operation of rotating the control wheel 110W in the R2 direction is assigned an operation of moving the focus area 60 in an up direction on the display screen (see FIG. 9B).

Furthermore, among the second type operations, the button 110a is assigned an operation of moving the focus area 60 in the up direction on the display screen (see FIG. 9B), the button 110b is assigned an operation of moving the focus area 60 in the down direction on the display screen, the button 110c is assigned an operation of moving the focus area 60 in a left direction on the display screen (see FIG. 9C), and the button 110d is assigned an operation of moving the focus area 60 in a right direction on the display screen.

In the magnified focus mode, the focus area 60 can be moved in the up-down direction by either the rotating operation of the control wheel 110W that is the first type operation or the pressing operation of the buttons 110a, 110b that is the second type operation. However, sequential movement in the up-down direction can be performed more smoothly by the rotating operation by the control wheel 110W that is the first type operation than by the pressing operation by the buttons 110a and 110b. Therefore, it is desired to avoid interrupting the sequential movement of the focus area 60 in the up-down direction due to detection of the pressing operation by the buttons 110a and 110b during the rotating operation by the control wheel 110W that is the first type operation.

Accordingly, it is desirable not to reflect the pressing operation of the buttons 110a and 110b among the second type operations during the determination period FT corresponding to the first type operation. However, after the operation in the up-down direction by the first type operation is completed, it is necessary to move the focus area 60 in the up-down direction by the pressing operation by the buttons 110a and 110b for fine adjustment, and thus the period of the determination period FT is desirably set to a time shorter than 250 msec in the viewing mode, for example, 100 msec.

On the other hand, in order not to miss a photo opportunity, even if the focus area 60 is sequentially moved by the rotating operation of the control wheel 110W that is the first type operation, the movement in the left-right direction by the pressing operation by the buttons 110c and 110d needs to be done quickly. Therefore, it is desirable that the pressing operation by the buttons 110c and 110d among the second type operations is not restricted even during the determination period FT.

Next, the menu mode will be described with reference to FIGS. 10A, 10B and 10C.

Figure 10:
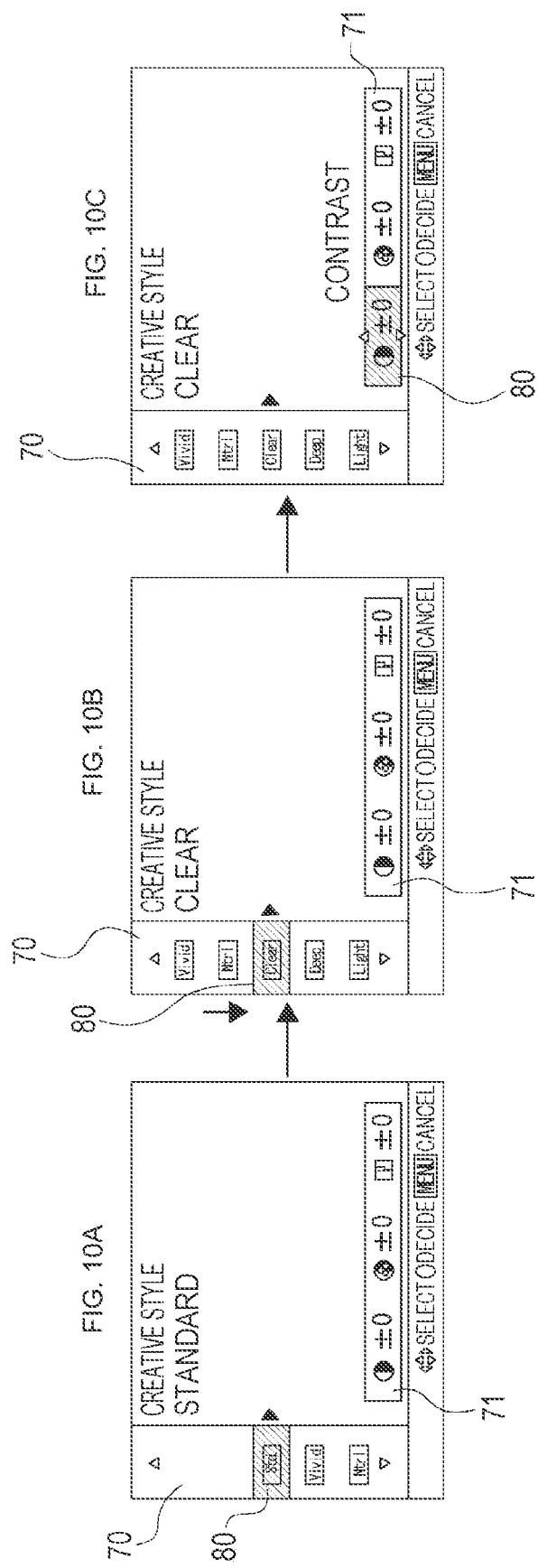
FIGS. 10A, 10B and 10C are explanatory diagrams of a menu screen display example of the embodiment.

In the menu mode, a menu selection frame 80 is displayed in menu selection areas 70 and 71 on the display unit 15 as illustrated in FIG. 10A, and various displayed functions can be set by selecting the menu selection frame 80.

In the menu mode, among the first type operations, the operation of rotating the control wheel 110W in the R1 direction is assigned an operation of moving the menu selection frame 80 in the down direction in the menu selection area 70 or the like (see FIG. 10B), and the operation of rotating the control wheel 110W in the R2 direction is assigned an operation of moving the menu selection frame 80 in the up direction in the menu selection area 70 or the like.

Furthermore, among the second type operations, the button 110a is assigned an operation of moving the menu selection frame 80 in the up direction in the menu selection area 70 or the like (see FIG. 10C), the button 110b is assigned an operation of moving the menu selection frame 80 in the down direction in the menu selection area 70 or the like, the button 110c is assigned an operation of moving the menu selection frame 80 in the left direction in the menu selection area 70 or the like (see FIG. 9C), and the button 110d is assigned an operation of moving the menu selection frame 80 in the right direction in the menu selection area 70 or the like.

In the menu mode, the menu selection frame 80 can be moved in the up-down direction by either the rotating operation of the control wheel 110W that is the first type operation, or the pressing operation of the buttons 110a, 110b that is the second type operation. However, sequential movement in the up-down direction can be performed more smoothly by the rotating operation by the control wheel 110W that is the first type operation than by the pressing operation by the buttons 110a and 110b. Therefore, it is desired to avoid interrupting the sequential movement of the menu selection frame 80 in the up-down direction due to detection of the pressing operation by the buttons 110a and 110b during the rotating operation by the control wheel 110W that is the first type operation.

Accordingly, it is desirable not to reflect the pressing operation of the buttons 110a and 110b among the second type operations during the determination period FT corresponding to the first type operation.

Furthermore, the selection operation of menu by the menu selection frame 80 is often operated slowly, and thus it is desirable that the period of the determination period FT is set longer than 250 msec in the viewing mode, for example, 300 msec, in order to prevent interruption of the second type operation.

Even if the menu selection frame 80 is sequentially moving in the up-down direction due to the rotating operation of the control wheel 110W that is the first type operation, movement in the right direction by the pressing operation by the button 110d needs to be performed quickly in order to proceed to the next layer by selecting the menu. Therefore, it is desirable that the pressing operation by the button 110d among the second type operations is not restricted even during the determination period FT.

On the other hand, if the pressing operation by the button 110c among the second type operations to return the menu to the previous layer frequently occurs as an erroneous operation, it is possible to lead to a problem that the user cannot easily reach the intended menu, and thus it is desirable to inhibit the pressing operation of the button 110c among the second type operations from being reflected during the determination period FT corresponding to the first type operation.

Hereinafter, processing of the camera control unit 30 of the second embodiment will be described with reference to FIGS. 11 and 12. Note that the same reference numerals are given to the processes common to those of the first embodiment, and the description thereof will be omitted.

The mode setting processing will be described with reference to FIG. 11.

First, in step S201, the camera control unit 30 monitors the switching operation of the operating mode (mode switching operation) by the user.

If a mode switching operation is detected in step S201, the camera control unit 30 advances the process to step S202 and clears flags of an up-down flag, a left flag, and a right flag. That is, the process of turning off the up-down flag, the left flag, and the right flag is performed.

Here, the up-down flag is a flag indicating whether or not the operation in the up-down direction by the buttons 110a, 110b among the second type operations is determined as an invalid operation in the determination period FT (state in which the operation restriction flag is on) corresponding to the first type operation. In a case where the operation by the buttons 110a and 110b is an invalid operation, the up-down flag is turned on, and in a case where the operation is a valid operation, the up-down flag is turned off.

Furthermore, the left flag is a flag indicating whether or not the operation in the left direction by the button 110c among the second type operations is determined as an invalid operation in the determination period FT (state in which the operation restriction flag is on) corresponding to the first type operation. In a case where the operation by the button 110c is an invalid operation, the left flag is turned on, and in a case where it is a valid operation, the up-down flag is turned off.

Moreover, the right flag is a flag indicating whether or not the operation in the right direction by the button 110d among the second type operations is determined as an invalid operation in the determination period FT (state in which the operation restriction flag is on) corresponding to the first type operation. In a case where the operation by the button 110d is an invalid operation, the right flag is turned on, and in a case where it is a valid operation, the up-down flag is turned off.

After step S202, the camera control unit 30 determines which operating mode it corresponds to in steps S203, S208, and S211.

In a case where the operating mode after switching is the viewing mode, the camera control unit 30 advances the process from step S203 to step S204, turns on the up-down flag, turns on the left flag in step S205, and turns on the right flag in step S206. Thus, in the determination period FT corresponding to the first type operation, the operation by the buttons 110a, 110b, 110c, and 110d is determined as an invalid operation.

Thereafter, the camera control unit 30 sets the timer of the determination period FT to 250 msec in step S207, and performs the monitoring until a switching operation of the mode is detected in step S201.

In a case where the mode after switching is the magnified focus mode, the camera control unit 30 advances the process from step S208 to step S209 and turns on the up-down flag. Thus, in the determination period FT corresponding to the first type operation, the operation by the buttons 110a and 110b is determined as an invalid operation.

Thereafter, the camera control unit 30 sets the timer of the determination period FT to 100 msec in step S210, and performs the monitoring until a switching operation of the operating mode is detected in step S201.

In a case where the operating mode after switching is the menu mode, the camera control unit 30 advances the process from step S211 to step S212, turns on the up-down flag, and turns on the left flag in step S213. Thus, in the determination period FT corresponding to the first type operation, the operation by the buttons 110a, 110b, and 110c is determined as an invalid operation.

Thereafter, the camera control unit 30 sets the timer of the determination period FT to 300 msec in step S214, and performs the monitoring until a switching operation of the operating mode is detected in step S201.

In a case where the operating mode after switching is an operating mode other than the above-described three, the camera control unit 30 sets the timer of the determination period FT to zero msec in step S215, and performs the monitoring until a switching operation of the operating mode is detected in step S201.

Note that the camera control unit 30 may be configured not to provide the timer for the determination period FT for operating modes other than the above-described three, and not to set the timer itself for the determination period FT in step S215.

Furthermore, even in an operating mode other than the above-described three operating modes, a process of turning on the up-down flag, the left flag, and the right flag may be executed according to the characteristics of the operating mode, or the timer of the determination period FT may be set.

By the above mode setting processing, every time the operating mode is switched, the restriction on the second type operation reflecting the characteristics of the switched operating mode and the length of the determination period FT are determined.

The operation response processing in the second embodiment will be described with reference to FIG. 12.

The camera control unit 30 repeats the processes of steps S101, S106, and S107 as the monitoring loop to monitor the rotating operation (first type operation) of the control wheel 110W and the pressing operation (second type operation) of the buttons 110a, 110b, 110c, and 110d.

If the camera control unit 30 detects that the user has performed a rotating operation (first type operation) of the control wheel 110W, the camera control unit 30 advances the process from step S101 to step S102, resets the timer, and then starts the timer according to the operating mode as the current determination period FT. For example, the timer of 250 msec is started in a case of the viewing mode, 110 msec in the magnified focus mode, and 300 msec in a case of the menu mode.

Then, in step S103, the camera control unit 30 executes the first type operation response processing corresponding to the rotating operation (first type operation) of the control wheel 110W. Here, the first type operation response processing is, for example, image forwarding in the case of the viewing mode (see FIGS. 4A and 4C), moving the focus area 60 in the up-down direction on the display screen in the case of the magnified focus mode, and moving the menu selection frame 80 in the up-down direction in the menu selection areas 70 and 71 in the case of the menu mode.

In a case where the operation restriction flag is off in step S104, the camera control unit 30 advances the process from step S104 to step S105 and turns on the operation restriction flag. The determination period FT is started when the operation restriction flag is turned on.

The camera control unit 30 returns to the monitoring loop after turning on the operation restriction flag in step S105.

If the camera control unit 30 detects the second type operation in step S107, the camera control unit 30 advances the process from step S107 to step S301 and checks whether the operation restriction flag is on.

In a case where the operation restriction flag is turned on in step S301, the camera control unit 30 determines which of the buttons 110a, 110b, 110c, and 110d is operated in steps S302, S305, and S308.

Here, processing of the camera control unit 30 for each of the operating modes of the viewing mode, the magnified focus mode, and the menu mode will be described.

First, a case where the operating mode is the viewing mode will be described.

In a case where the up-down operation among the second type operations, that is, the pressing operation of the buttons 110a and 110b is detected in step S302, the camera control unit 30 advances the process from step S302 to step S303.

At this time, in the viewing mode, since the up-down flag is turned on during the mode setting processing (S204 in FIG. 11), the camera control unit 30 returns to the monitoring loop from step S303 without performing response processing A in step S304. That is, the detected up-down operation is determined to be an invalid operation.

The response processing A here is processing in which a screen illustrating various setting states is displayed by an up operation by pressing the button 110a, and a screen for setting the volume is displayed by a down operation by pressing the button 110b.

Furthermore, in a case where a left operation among the second type operations, that is, the pressing operation of the button 110c is detected in step S305, the camera control unit 30 advances the process from step S305 to step S306.

At this time, in the viewing mode, since the left flag is turned on in the mode setting processing (S205 in FIG. 11), the camera control unit 30 returns to the monitoring loop from step S306 without performing response processing B in step S307. That is, the detected left operation is determined to be an invalid operation.

The response processing B here is processing in which a screen for setting exposure correction is displayed.

Moreover, in a case where a right operation among the second type operations, that is, the pressing operation of the button 110d is detected in step S308, the camera control unit 30 advances the process from step S308 to step S309.

At this time, in the viewing mode, since the right flag is turned on during the mode setting processing (S206 in FIG. 11), the camera control unit 30 returns to the monitoring loop from step S309 without performing response processing C in step S310. That is, the detected right operation is determined to be an invalid operation.

The response processing C here is processing in which a screen for setting the flash mode is displayed.

Next, a case where the operating mode is the magnified focus mode will be described.

In a case where the up-down operation is detected in step S302, the camera control unit 30 advances the process from step S302 to step S303.

At this time, in the magnified focus mode, since the up-down flag is turned on during the mode setting processing (S209 in FIG. 11), the camera control unit 30 returns to the monitoring loop from step S303 without performing the response processing A in step S304. That is, the detected up-down operation is determined to be an invalid operation.

The response processing A here is a process of moving the focus area 60 in the up-down direction on the display screen.

Furthermore, in a case where the left operation is detected in step S305, the camera control unit 30 advances the process from step S305 to step S306.

At this time, since the left flag is off during the mode setting processing in the magnified focus mode, the camera control unit 30 advances the process from step S306 to step S307 and executes the response processing B. That is, the detected left operation is determined to be a valid operation.

Here, the response processing B is processing of moving the focus area 60 in the left direction on the display screen.

The camera control unit 30 returns to the monitoring loop after the response processing B in step S307.

Moreover, in a case where the right operation is detected in step S308, the camera control unit 30 advances the process from step S308 to step S309.

At this time, since the right flag is off during the mode setting processing in the magnified focus mode, the camera control unit 30 advances the process from step S309 to step S310 and executes the response processing C. That is, the detected right operation is determined to be a valid operation.

Here, the response processing C is processing of moving the focus area 60 in the right direction on the display screen.

The camera control unit 30 returns to the monitoring loop after the response processing C in step S310.

Next, a case where the operating mode is the menu mode will be described.

In a case where the up-down operation is detected in step S302, the camera control unit 30 advances the process from step S302 to step S303.

At this time, in the menu mode, since the up-down flag is turned on during the mode setting processing (S204 in FIG. 11), the camera control unit 30 returns to the monitoring loop from step S303 without performing the response processing A in step S304. That is, the detected up-down operation is determined to be an invalid operation.

The response processing A here is processing of moving the menu selection frame 80 in the up-down direction in the menu selection areas 70, 71.

Furthermore, in a case where the left operation is detected in step S305, the camera control unit 30 advances the process from step S305 to step S306.

At this time, in the menu mode, since the left flag is turned on during the mode setting processing (S205 in FIG. 11), the camera control unit 30 returns to the monitoring loop from step S306 without performing the response processing B in step S307. That is, the detected left operation is determined to be an invalid operation.

The response processing B here is processing of moving the menu selection frame 80 in the left direction in the menu selection areas 70 and 71.

Moreover, in a case where the right operation is detected in step S308, the camera control unit 30 advances the process from step S308 to step S309.

At this time, since the right flag is off during the mode setting processing in the magnified focus mode, the camera control unit 30 advances the process from step S309 to step S310 and executes the response processing C. That is, the detected right operation is determined to be a valid operation.

The response processing C here is processing of moving the menu selection frame 80 in the right direction in the menu selection areas 70 and 71.

The camera control unit 30 returns to the monitoring loop after the response processing C in step S310.

In the monitoring loop, in a case where the timer started in step S102 times out, the camera control unit 30 advances the process from step S106 to step S109 and turns off the operation restriction flag. Thus, the determination period FT corresponding to the detection of the first type operation ends.

Note that in the embodiment, in a case where an operating mode other than the viewing mode, the magnified focus mode, and the menu mode is selected, the timer is set to 0 msec (S215 in FIG. 11), and thus even when the timer starts in step S102, the time-out occurs in step S106, and the operation restriction flag is turned off in step S109. That is, the determination period FT does not exist substantially.

If the second type operation is detected in step S107 while the operation restriction flag is off, the camera control unit 30 advances the process to steps S107, S301, and S311. In step S311, the camera control unit 30 executes the second type operation response processing corresponding to the detected up-down operation, left operation, or right operation corresponding to each of the operating modes, and returns the process to the monitoring loop.

Thereafter, in the monitoring loop, in a case where the second type operation is detected in step S107 in a state where the first type operation is not detected in step S101, the camera control unit 30 similarly advances the process to the steps S107, S301, and S311 and executes the second type operation response processing.

According to the second embodiment described above, it is possible to set the determination period FT suitable for every characteristic of the operating mode and restrict the processing corresponding to the second type operation.

5. Summary and Modification Example

Figure 12:
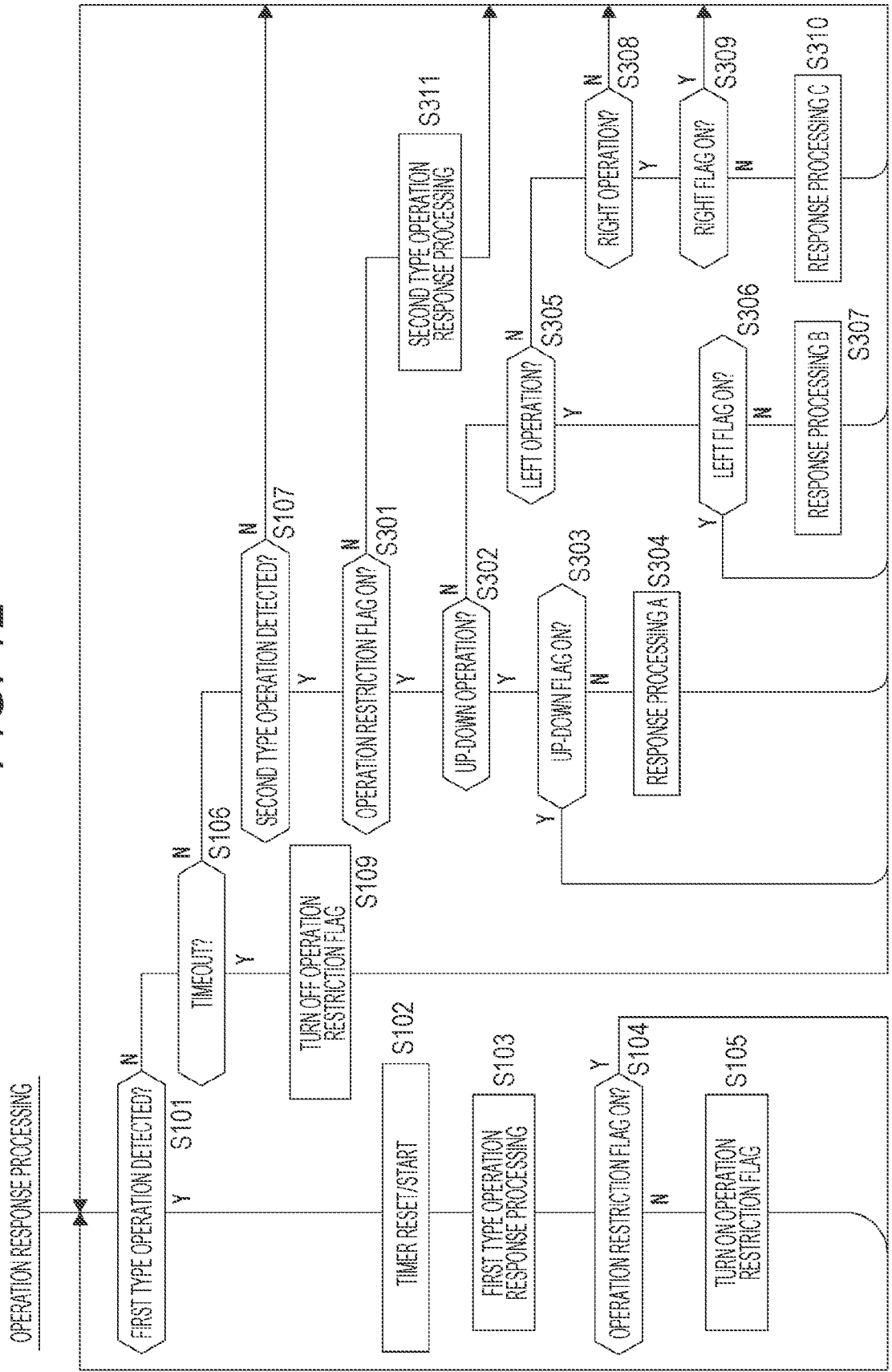
FIG. 12 is a flowchart of a processing example of the second embodiment.
Figure 13:
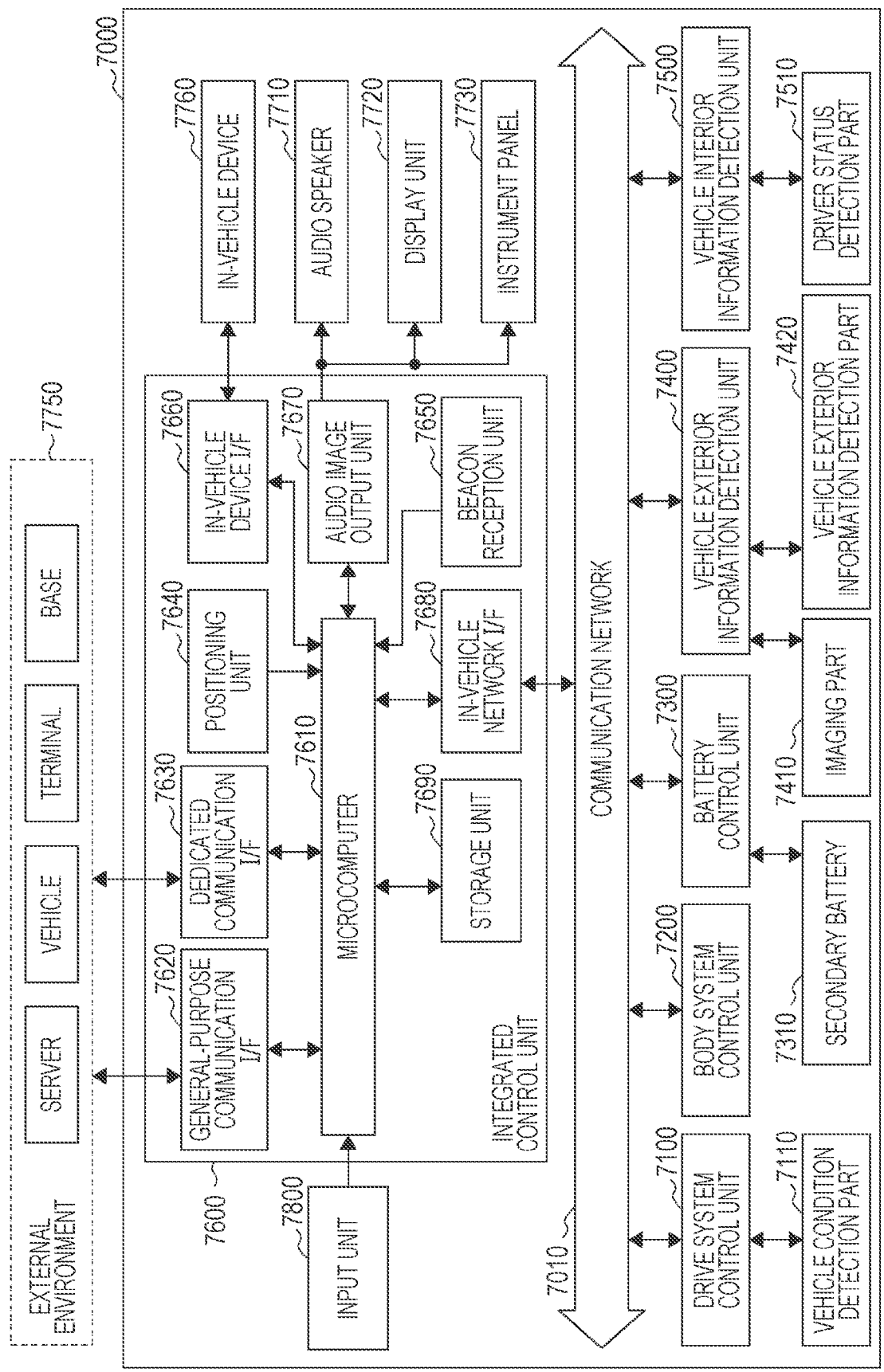
FIG. 13 is a block diagram illustrating an example of a schematic configuration of a vehicle control system.

The operation control device (camera control unit 30) mounted on the imaging device 1 of the embodiment includes an operation detection unit 31 that detects a first type operation and a second type operation having an operation area common to the first type operation, an operation response processing unit 32 that performs response processing corresponding to the first type operation and the second type operation detected by the operation detection unit 31, an operation determination unit 33 that determines whether the second type operation detected by the operation detection unit 31 is a valid operation or an invalid operation in a determination period FT corresponding to that the operation detection unit 31 has detected the first type operation (FIGS. 8 and 12). That is, in the determination period FT corresponding to detection of the first type operation, it is determined whether or not to execute the response processing corresponding to the second type operation.

Thus, for the second type operation having an operation area common to the first type operation, it is possible to inhibit the response processing from being executed during the determination period FT for the second type operation that may be detected as an erroneous operation during the first type operation. Therefore, when the user performs the first type operation on the operation area, it is possible to prevent the second type operation not intended by the user from being erroneously detected, and a smooth operation on the operation area by the user is achieved.

On the other hand, for the second type operation that is not likely to be recognized as an erroneous operation of the first type operation even if the operation area is common to the first type operation, or for the second type operation for which it is necessary to reflect an operation immediately even during the first type operation, the response processing corresponding to the second type operation can be executed even during the determination period FT.

Thus, it is possible to selectively set the second type operation that has to be a valid operation and the second type operation that has to be an invalid operation during the determination period FT. Therefore, it is possible to improve the operability in the operation area by the user.

Furthermore, in the operation control device (camera control unit 30) of the embodiment, the second type operation is an operation that may be detected by the first type operation (FIGS. 2, 5A, 5B, 5C, and 5D). That is, the second type operation is an operation that may be erroneously operated when the user performs the first type operation.

Thus, during the determination period FT corresponding to detection of the first type operation, the second type operation that may be erroneously operated when the user performs the first type operation can be determined as an invalid operation. By making it possible to determine the second type operation that may be an erroneously operated as an invalid operation, it is possible to improve accuracy of executing an operation that reflects an intention of the user.

Moreover, the operation control device (camera control unit 30) of the embodiment determines that the second type operation is an invalid operation in the determination period FT (S108 or the like in FIG. 8). Thus, in the determination period corresponding to that the first type operation has been detected, the response processing corresponding to the second type operation is executed, and the response processing corresponding to the second type operation is not executed.

Therefore, when the user performs the first type operation on the operation area, it is possible to prevent the second type operation not intended by the user from being erroneously detected, and to achieve a smooth operation on the operation area by the user.

Figure 11:
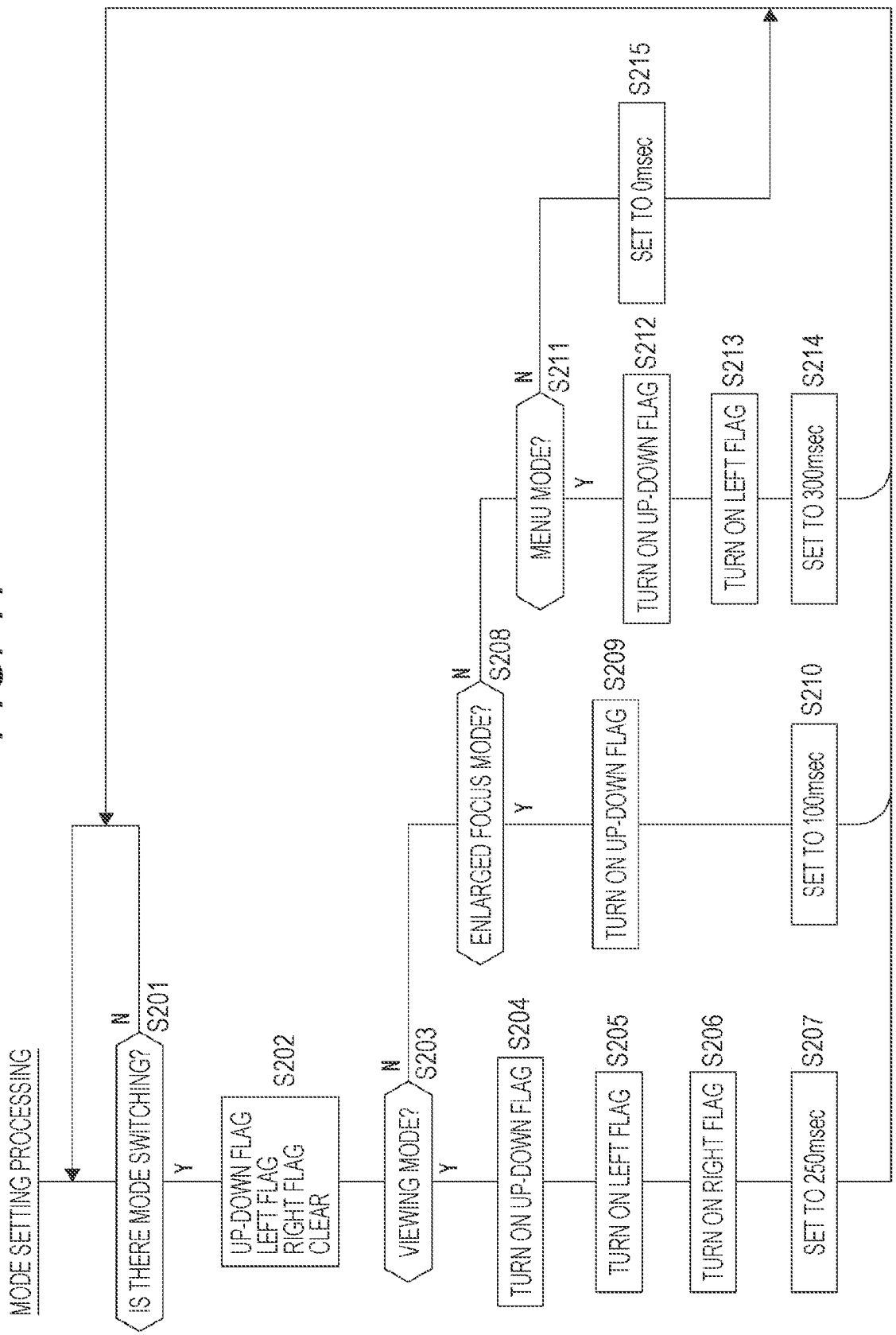
FIG. 11 is a flowchart of a processing example of a second embodiment.

Furthermore, in the operation control device (camera control unit 30) of the embodiment, the second type operation has a plurality of operation types (for example, a pressing operation of each of the buttons 110a, 110b, 110c, and 110d), and in a case where the second type operation is detected in the determination period FT, the camera control unit 30 determines whether it is a valid operation or an invalid operation according to the operation type (S208 to S209 and S211 to S213 in FIG. 11).

Thus, in the determination period FT corresponding to the detection of the first type operation, whether the response processing corresponding to a pressing operation of each of the buttons 110a, 110b, 110c, and 110d of the second type operation is executed or not is determined.

For example, in the magnified focus mode, it is better to limit the movement of the focus area 60 in the up-down direction by a pressing operation of the buttons 110a and 110b, but it is better not to limit the movement of the focus area 60 in the left-right direction by a pressing operation of the buttons 110c and 110d, in order to ensure the operability for the user.

In this manner, by determining whether it is a valid operation or an invalid operation for every operation type of the second type operation, it becomes possible to flexibly assume, as a valid operation, the second type operation that is expected not to become an erroneous operation and the second type operation that is considered to be necessary, even in the determination period FT corresponds to the first type operation. Therefore, the operability for the user can be further improved.

In addition, in the operation control device (camera control unit 30) of the embodiment, the determination period FT is a period from the timing corresponding to detection of the first type operation to the lapse of a predetermined time (S207, S210, 214, and S215 of FIGS. 7 and 11). That is, in a case where the second type operation is detected between the timing corresponding to the detection of the first type operation and the lapse of a predetermined time, it is determined whether or not to execute the response processing corresponding to the second type operation.

Therefore, upon performing the first type operation in the operation area, it is possible to set a period during which the first type operation is not interrupted by detecting the second type operation as the determination period FT, and it is possible to prevent the first type operation from being hindered by that the second type operation is detected as an erroneous detection.

In addition, in the operation control device (camera control unit 30) of the embodiment, the determination period FT is started every time the first type operation is detected (S101 and S102 in FIGS. 8 and S101 and S102 in FIG. 12).

That is, in a case where the first type operation is detected intermittently, it is determined whether or not to execute the response processing of the second type operation accompanying detection of the second type operation until the determination period corresponding to the detection of the last first type operation ends.

Therefore, even in a case where the first type operation is sequentially operated, it is possible to prevent the sequential operation from being interrupted by the second type operation. Thus, operability when the user sequentially operates can be improved.

Furthermore, in the operation control device (camera control unit 30) of the embodiment, the determination period FT is variably set according to the operating mode (S207, S210, 214, and S215 in FIG. 11). Thus, the determination period FT is set corresponding to the functions of the first type operation and the second type operation in each operating mode.

Therefore, the determination period FT that reflects the characteristics of each operating mode can be flexibly set.

The feeling of discomfort of erroneous operation or the like due to the second type operation that is felt by the user differs depending on each operating mode.

For example, in the magnified focus mode, it is desirable not to reflect the pressing operation of the buttons 110a, 110b among the second type operations during the determination period FT corresponding to the first type operation, but after the operation in the up-down direction by the first type operation is completed, it is better to make the period of the determination period FT short because it is necessary to move the focus area 60 in the up-down direction by a pressing operation of the buttons 110a and 110b for fine adjustment.

On the other hand, in the menu mode, since the selection operation of menu by the menu selection frame 80 is often operated slowly, there is little discomfort given to the user even if the period of the determination period FT is set long in some measure.

In this manner, being able to flexibly change the determination period FT according to the characteristics of the operating mode is useful for ensuring or improving the operability for the user.

Moreover, in the operation control device (camera control unit 30) of the embodiment, in a certain operating mode, the process of determining whether the detected second type operation is a valid operation or an invalid operation may be omitted (FIG. 12).

For example, in the mode setting processing illustrated in FIG. 11, in a case where the operating mode is switched to a certain operating mode, the camera control unit 30 performs the first type operation response processing corresponding to detection of the first type operation, and performs the second type operation response processing corresponding to detection of the second type operation, and the process illustrated in FIG. 12 may be omitted.

Thus, even in the middle of executing the first type operation intermittently, in a case where the second type operation is detected, the response processing corresponding to the second type operation is executed by interruption. This is useful in an operating mode in which it is necessary to immediately switch to the response processing corresponding to the second type operation even in the middle of executing the first type operation intermittently.

Furthermore, in the operating mode (viewing mode) in which an image is displayed according to the operation, the operation control device (camera control unit 30) determines that the first type operation is an operation of changing the displayed image, the second type operation is an operation different from the first type operation, and the camera control unit 30 determines that the second type operation is an invalid operation in the determination period FT (S108 in FIG. 8).

Thus, in the viewing mode, during the determination period FT corresponding to detection of the operation of changing the displayed image, operations other than the operation of changing the displayed image (second type operation) are not executed.

Therefore, while the user is viewing the captured image while performing image forwarding, it is possible to prevent the screen display from being switched to, for example, the setting of exposure correction, the volume setting screen, the setting screen of flash mode, and the like due to an erroneous detection of the second type operation. Thus, the user can comfortably perform image forwarding of the captured images in the viewing mode.

In addition, in the operation control device (camera control unit 30), in the operating mode (magnified focus mode) in which the focus area 60 of the imaging device 1 can be selected on the display screen, the first type operation is an operation to move the specified focus area 60 among a plurality of focus areas in one of up-down directions or left-right directions, the second type operation is an operation to move the specified focus area 60 among the plurality of focus areas in the other of the up-down directions or the left-right directions, and the camera control unit 30 determines that the second type operation is an invalid operation in the determination period FT (FIGS. 11 and 12).

Specifically, in the mode setting processing of FIG. 11, when the camera control unit 30 detects switching to the magnified focus mode in step S208, the camera control unit 30 turns on the left and right flags, in addition to turning on the up-down flag in step S209.

Then, in the operation response processing of FIG. 12, in a state where the operation restriction flag is turned on by the process of step S105, it is assumed that the camera control unit 30 detects the second type operation (process of moving the focus area 60 in the left-right direction) in a direction different from the first type operation (process of moving the focus area 60 in the up-down direction) in step S107.

At this time, in a case where the second type operation is a left operation, the camera control unit 30 advances the process in the order of steps S301, S302, S305, S306, and S101. That is, in the determination period FT, the left operation of the second type operation is determined to be an invalid operation.

Similarly, in a case where the second type operation is a right operation, the camera control unit 30 advances the process in steps S301, S302, S305, S308, S309, and S101. That is, in the determination period FT, the right operation of the second type operation is also determined to be an invalid operation.

Thus, when performing an operation of sequentially moving the focus area 60 to one side, an operation of moving the focus area 60 to the other side is restricted during the determination period FT, and when the user sequentially moves the focus area 60 to one side, it is possible to prevent an erroneous operation due to the focus area 60 moving to the other side, and the user can comfortably move the focus area 60 to the imaging target. Therefore, the user can comfortably perform imaging by the imaging device 1.

In addition, the operation control device (camera control unit 30) is such that, in the operating mode (menu mode) in which the menu can be selected on the display screen, the first type operation is an operation to move the selection areas 70 and 71 specified among a plurality of menus in one of up-down directions or left-right directions, and the second type operation is an operation to move a selection area specified in the plurality of menus to one of the other of the up-down directions or the left-right directions, and it is conceivable that the camera control unit 30 determines that the second type operation is an invalid operation in the determination period FT.

In the menu mode, even if the menu selection frame 80 is sequentially moving in the up-down direction by the first type operation, movement in the right direction by the second type operation needs to be done quickly so as to advance to the next layer by selecting the menu. Therefore, it is better not to restrict the right operation among the second type operations even during the determination period FT.

On the other hand, if the left operation among the second type operations that returns the menu to the previous layer occurs frequently as an erroneous operation, it may cause inconvenience that the user cannot easily reach the intended menu, and thus it is desirable not to reflect the pressing operation of the button 110c among the second type operations during the determination period FT corresponding to first type operation.

In this manner, when performing an operation to sequentially move the selection area to one side, by limiting the operation to move the selected area to one of other sides during the determination period FT, operability in menu selection in the menu mode can be improved.

Furthermore, when the operation control device (camera control unit 30) is in the first mode (viewing mode) in which an image to be reproduced is selected according to the operation, it is conceivable that the determination period FT is set longer than when it is in the second mode (magnified focus mode) in which the focus area 60 of the imaging device 1 is selectable on the display screen (S207 and S210 in FIG. 11).

In the magnified focus mode, it is highly necessary to move the focus area 60 up, down, left, or right quickly so as not to miss a photo opportunity, and thus the determination period FT is set shorter than in the viewing mode.

In this manner, it is useful to flexibly set the determination period FT in consideration of the characteristics of the magnified focus mode in order to secure or improve the operability for the user in the magnified focus mode.

Moreover, it is conceivable that the operation control device (camera control unit 30) detects the first type operation and the second type operation from a common control (FIG. 2).

Since the first type operation and the second type operation are performed by one control, it can be said that there is a high possibility that the second type operation is performed as an erroneous operation of the first type operation. By limiting such a second type operation that is likely to be erroneously performed, the operability of the control for the user can be improved.

Furthermore, in the operation control device (camera control unit 30), the control is the control wheel 110W, and it is conceivable that the first type operation is an operation of rotating the control wheel 110W, and the second type operation is an operation of pressing the control wheel 110W (FIG. 2).

When performing an operation to rotate the control wheel 110W, the control wheel 110W may be pressed by adjustment of force by the user during the rotating operation of the control wheel 110W, which may be detected as the second type operation.

Therefore, during the determination period FT after the operation of rotating the control wheel 110W is detected, the operability of the control wheel 110W of the user can be improved by determining that the pressing operation of the control wheel 110W is an invalid operation.

In addition, it is conceivable that in the operation control device (camera control unit 30), the control is a touch control that detects a contact operation by the user, and the first type operation and the second type operation are contact operations to touch controls of different operation types from each other.

The touch control is detected via a contact operation by the user, and thus there is a possibility that the first type operation is erroneously detected as the second type operation due to an ambiguous operation by the user.

Therefore, during the determination period FT after a contact operation on the touch control, which is the first type operation, by the user is detected, a contact operation on the touch control, which is the second type operation, is determined as an invalid operation, and thereby operability of the touch control by the user can be improved.

In the imaging device 1 (camera control unit 30) of the embodiment, an operation detection unit 31 that detects a first type operation and a second type operation having an operation area common to the first type operation, an operation response processing unit 32 that performs response processing corresponding to the first type operation and the second type operation detected by the operation detection unit 31, an operation determination unit 33 that determines whether the second type operation detected by the operation detection unit 31 is a valid operation or an invalid operation in a determination period FT corresponding to that the operation detection unit 31 has detected the first type operation (FIGS. 8 and 12). That is, in the determination period FT corresponding to detection of the first type operation, it is determined whether or not to execute the response processing corresponding to the second type operation.

Thus, for the second type operation having an operation area common to the first type operation, it is possible to inhibit the response processing from being executed during the determination period FT for the second type operation that may be detected as an erroneous operation during the first type operation. Therefore, when the user performs the first type operation on the operation area, it is possible to prevent a second type operation not intended by the user from being erroneously detected, and a smooth operation on the operation area by the user is achieved.

In recent years, the imaging device 1 has been miniaturized, and there are an increasing number of cases where an operation to exert a plurality of functions is set to one control. In such a case, there is an increasing possibility that the second type operation will be erroneously detected when the first type operation is performed on a certain control.

In view of such circumstances, it can be said that enabling restriction on execution of a corresponding operation by the second type operation in the determination period FT corresponding to detection of the first type operation in the operation area in the imaging device 1 is useful for improving operability of the imaging device 1.

6. Application Example

The technology according to the present disclosure can be applied to various products. For example, the technology according to the present disclosure may be achieved as a device mounted on any type of mobile object such as an automobile, an electric vehicle, a hybrid electric vehicle, a motorcycle, a bicycle, a personal mobility, an airplane, a drone, a ship, a robot, a construction machine, a farm machine (tractor), and the like.

Figure 14:
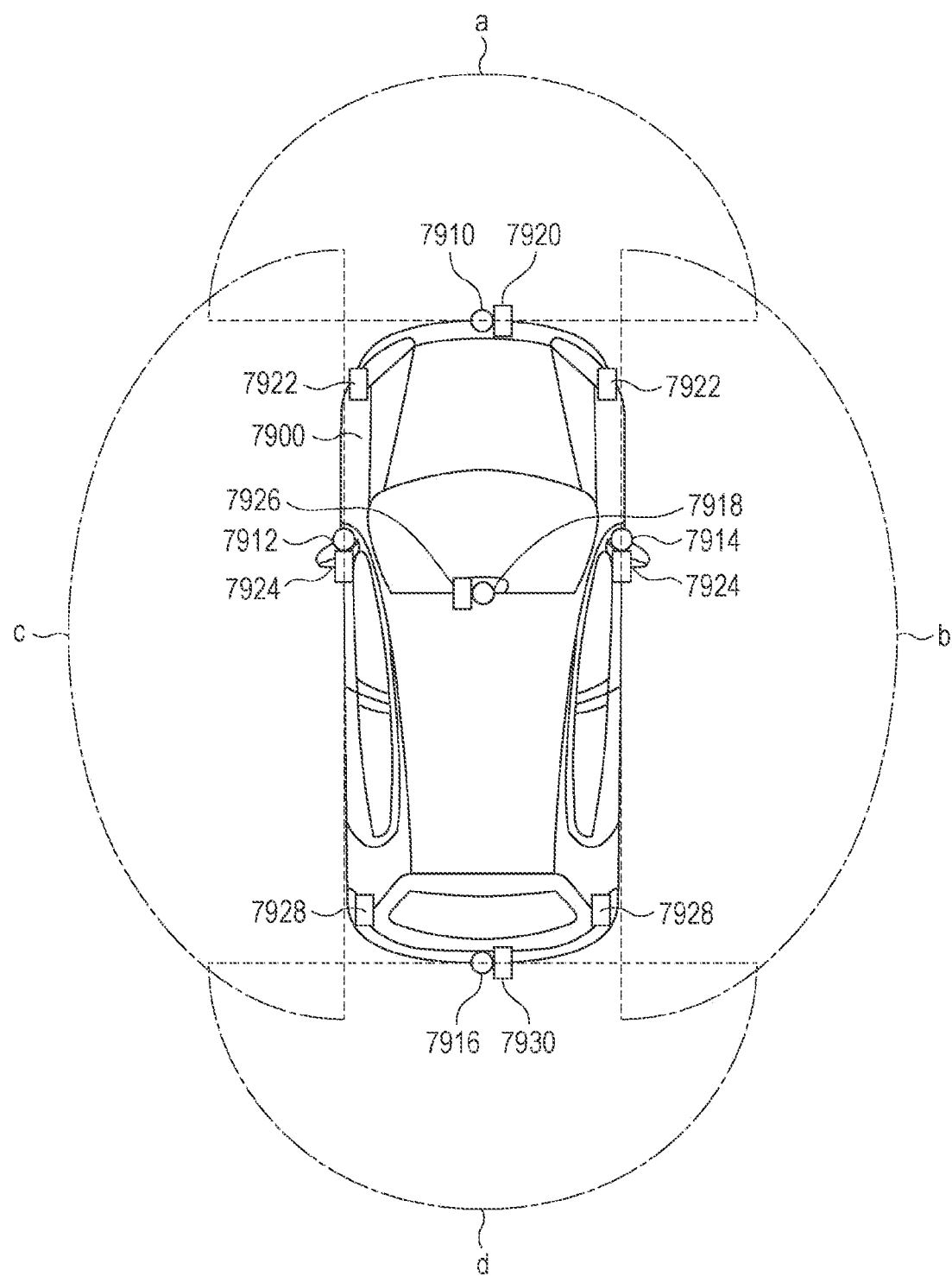
FIG. 14 is an explanatory diagram illustrating an example of installation positions of a vehicle exterior information detection part and imaging parts.

FIG. 14 is a block diagram illustrating a schematic configuration example of a vehicle control system 7000 that is an example of a mobile object control system to which the technology according to the present disclosure can be applied. A vehicle control system 7000 includes a plurality of electronic control units connected via a communication network 7010. In the example illustrated in FIG. 14, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 that connects the plurality of these control units is, for example, an in-vehicle communication network that conforms to any standard such as Controller Area Network (CAN), Local Interconnect Network (LIN), Local Area Network (LAN), or FlexRay (registered trademark).

Each control unit includes a microcomputer that performs arithmetic processing according to various programs, a storage unit that stores a program executed by the microcomputer or parameters and the like used for various calculations, and a drive circuit that drives various control target devices. Each control unit is provided with a network I/F for communicating with other control units via the communication network 7010, and is provided with a communication I/F for communicating with devices, sensors, or the like inside or outside the vehicle by wired communication or wireless communication. In FIG. 14, as the functional configuration of the integrated control unit 7600, a microcomputer 7610, a general-purpose communication I/F 7620, a dedicated communication I/F 7630, a positioning unit 7640, a beacon reception unit 7650, an in-vehicle device I/F 7660, an audio image output unit 7670, an in-vehicle network I/F 7680, and a storage unit 7690 are illustrated. Other control units similarly include a microcomputer, a communication I/F, a storage unit, and the like.

The drive system control unit 7100 controls operation of devices related to the drive system of the vehicle according to various programs. For example, the drive system control unit 7100 functions as a control device for a driving force generation device for generating driving force of the vehicle such as an internal combustion engine or a driving motor, a driving force transmission mechanism for transmitting driving force to wheels, a steering mechanism for adjusting a steering angle of the vehicle, and a braking device for generating a braking force of the vehicle, and the like. The drive system control unit 7100 may have a function as a control device such as an antilock brake system (ABS) or electronic stability control (ESC).

A vehicle condition detection part 7110 is connected to the drive system control unit 7100. The vehicle condition detection part 7110 may include, for example, a gyro sensor that detects angular velocity of the axial rotation of the vehicle body, an acceleration sensor that detects acceleration of the vehicle, or at least one of sensors for detecting an accelerator pedal operation amount, a brake pedal operation amount, a steering wheel steering angle, an engine speed, a wheel speed, or the like. The drive system control unit 7100 performs arithmetic processing using a signal input from the vehicle condition detection part 7110 to control an internal combustion engine, a drive motor, an electric power steering device, a braking device, or the like.

The body system control unit 7200 controls operation of various devices mounted on the vehicle body according to various programs. For example, the body system control unit 7200 functions as a control device for a keyless entry system, a smart key system, and a power window device, or various lamps such as a head lamp, a back lamp, a brake lamp, a blinker, or a fog lamp, and the like. In this case, radio waves transmitted from a portable device that substitutes for a key or signals from various switches can be input to the body system control unit 7200. The body system control unit 7200 receives input of these radio waves or signals, and controls a door lock device, a power window device, a lamp, and the like of the vehicle.

The battery control unit 7300 controls a secondary battery 7310, which is a power supply source of the drive motor, according to various programs. For example, information such as battery temperature, battery output voltage, or remaining battery capacity is input to the battery control unit 7300 from a battery device including the secondary battery 7310. The battery control unit 7300 performs arithmetic processing using these signals, and performs temperature regulation control of the secondary battery 7310 or a cooling device provided in the battery device, or the like.

The vehicle exterior information detection unit 7400 detects information external to the vehicle on which the vehicle control system 7000 is mounted. For example, at least one of an imaging part 7410 or a vehicle exterior information detection part 7420 is connected to the vehicle exterior information detection unit 7400. The imaging part 7410 includes at least one of a time-of-flight (ToF) camera, a stereo camera, a monocular camera, an infrared camera, or other cameras. The vehicle exterior information detection part 7420 includes, for example, at least one of an environmental sensor for detecting the current weather or climate, or an ambient information detection sensor for detecting another vehicle, an obstacle, a pedestrian, or the like around the vehicle equipped with the vehicle control system 7000.

The environmental sensor may be, for example, at least one of a raindrop sensor that detects rainy weather, a fog sensor that detects fog, a sunshine sensor that detects the degree of sunshine, or a snow sensor that detects snowfall. The surrounding information detection sensor may include at least one of, for example, an ultrasonic sensor, a radar, a LIDAR (Light Detection and Ranging, Laser Imaging Detection and Ranging) device, or the like. The imaging part 7410 and the vehicle exterior information detection part 7420 may each be provided as an independent sensor or device, or may be provided as a device in which a plurality of sensors or devices is integrated.

Here, FIG. 15 illustrates an example of installation positions of the imaging part 7410 and the vehicle exterior information detection part 7420. Imaging parts 7910, 7912, 7914, 7916, and 7918 are provided, for example, at at least one of a front nose, a side mirror, a rear bumper, a back door, or an upper part of a windshield in the cabin of a vehicle 7900. The imaging part 7910 provided on the front nose and the imaging part 7918 provided on the upper part of the windshield in the cabin mainly acquire a forward image of the vehicle 7900. The imaging parts 7912 and 7914 provided in the side mirrors mainly acquire images of sides of the vehicle 7900. The imaging part 7916 provided in the rear bumper or back door mainly acquires an image behind the vehicle 7900. The imaging part 7918 provided on the upper part of the windshield in the cabin is mainly used for detecting a preceding vehicle, a pedestrian, an obstacle, a traffic signal, a traffic sign, a lane, or the like.

Note that FIG. 15 illustrates an example of imaging ranges of the respective imaging parts 7910, 7912, 7914, and 7916. An imaging range a indicates the imaging range of the imaging part 7910 provided on the front nose, imaging ranges b, c indicate imaging ranges of the imaging parts 7912 and 7914 provided on the side mirrors, respectively, and an imaging range d indicates an imaging range of the imaging part 7916 provided in a rear bumper or a back door. For example, by overlaying image data captured by the imaging parts 7910, 7912, 7914, and 7916, an overhead image of the vehicle 7900 viewed from above can be obtained.

Vehicle exterior information detection parts 7920, 7922, 7924, 7926, 7928, and 7930 provided on the front, rear, sides, corners, and upper part of the windshield in the cabin of the vehicle 7900 may be, for example, ultrasonic sensors or radars. The vehicle exterior information detection parts 7920, 7926, and 7930 provided on the front nose, rear bumper, back door, and upper part of the windshield in the cabin of the vehicle 7900 may be, for example, a LIDAR device. These vehicle exterior information detection parts 7920 to 7930 are mainly used for detecting a preceding vehicle, a pedestrian, an obstacle, or the like.

Returning to FIG. 14, the description will be continued. The vehicle exterior information detection unit 7400 causes the imaging part 7410 to capture an image outside the vehicle, and receives captured image data. Furthermore, the vehicle exterior information detection unit 7400 receives detection information from the connected vehicle exterior information detection part 7420. In a case where the vehicle exterior information detection part 7420 is an ultrasonic sensor, a radar device, or a LIDAR device, the vehicle exterior information detection unit 7400 transmits ultrasonic waves, electromagnetic waves, or the like, and receives information of received reflected waves. The vehicle exterior information detection unit 7400 may perform an object detection process or a distance detection process of a person, a vehicle, an obstacle, a sign, or a character on a road surface, or the like on the basis of the received information. The vehicle exterior information detection unit 7400 may perform an environment recognition process for recognizing rainfall, fog, road surface conditions, and the like on the basis of the received information. The vehicle exterior information detection unit 7400 may calculate the distance to an object outside the vehicle on the basis of the received information.

Furthermore, the vehicle exterior information detection unit 7400 may perform an image recognition process or a distance detection process of recognizing a person, a vehicle, an obstacle, a sign, or a character on a road surface, or the like on the basis of the received image data. The vehicle exterior information detection unit 7400 may perform processing such as distortion correction or alignment on the received image data, and synthesize the image data captured by different imaging parts 7410 to generate an overhead image or a panoramic image. The vehicle exterior information detection unit 7400 may perform the viewpoint conversion process using the image data captured by different imaging parts 7410.

The vehicle interior information detection unit 7500 detects information in the vehicle. The vehicle interior information detection unit 7500 is connected to, for example, a driver status detection part 7510 that detects the status of the driver. The driver status detection part 7510 may include a camera that captures an image of the driver, a biometric sensor that detects biological information of the driver, a microphone that collects sound in the vehicle interior, and the like. The biometric sensor is provided on, for example, a seat surface or a steering wheel or the like, and detects biological information of a passenger sitting on the seat or a driver holding the steering wheel. The vehicle interior information detection unit 7500 may calculate the degree of fatigue or concentration of the driver on the basis of the detection information input from the driver status detection part 7510, or determine whether the driver is dozing or not. The vehicle interior information detection unit 7500 may perform processing such as noise canceling processing on a collected audio signal.

The integrated control unit 7600 controls overall operation in the vehicle control system 7000 according to various programs. An input unit 7800 is connected to the integrated control unit 7600. The input unit 7800 is achieved by a device such as a touch panel, a button, a microphone, a switch or a lever, which can be input-operated by a passenger, for example. Data obtained by recognizing a voice input by the microphone may be input to the integrated control unit 7600. The input unit 7800 may be, for example, a remote control device using infrared rays or other radio waves, or an externally connected device such as a mobile phone or personal digital assistant (PDA) corresponding to operation of the vehicle control system 7000. The input unit 7800 may be, for example, a camera, and in this case the passenger can input information by gesture. Alternatively, data obtained by detecting movement of a wearable device worn by the passenger may be input. Moreover, the input unit 7800 may include, for example, an input control circuit that generates an input signal on the basis of information input by the passenger or the like using the input unit 7800 described above and outputs the input signal to the integrated control unit 7600. By operating the input unit 7800, the passenger or the like inputs various data to the vehicle control system 7000 and gives an instruction on the processing operation.

The storage unit 7690 may include a read only memory (ROM) that stores various programs executed by the microcomputer, and a random access memory (RAM) that stores various parameters, calculation results, sensor values, and the like. Furthermore, the storage unit 7690 may be achieved by a magnetic storage device such as a hard disc drive (HDD), a semiconductor storage device, an optical storage device, an optical magnetic storage device, or the like.

The general-purpose communication I/F 7620 is a general-purpose communication I/F that mediates communication with various devices existing in an external environment 7750. The general-purpose communication I/F 7620 may be equipped with a cellular communication protocol such as the Global System of Mobile communications (GSM (registered trademark)), WiMAX (registered trademark), Long Term Evolution (LTE (registered trademark)) or LTE-Advanced (LTE-A), or another wireless communication protocols such as wireless LAN (also referred to as Wi-Fi (registered trademark) or Bluetooth (registered trademark). Moreover, for example, the general-purpose communication I/F 7620 may connect to a device (for example, an application server or a control server) existing on an external network (for example, the Internet, a cloud network, or an operator-specific network) via a base station or an access point. Furthermore, for example, the general-purpose communication I/F 7620 may use peer-to-peer (P2P) technology to connect with a terminal (for example, a terminal of a pedestrian or a store, or a machine-type communication (MTC) terminal) that exists near the own vehicle.

The dedicated communication I/F 7630 is a communication I/F that supports a communication protocol designed for use in vehicles. The dedicated communication I/F 7630 may be equipped with a standard protocol such as wireless access in vehicle environments (WAVE) or dedicated short range communications (DSRC), which are a combination of lower layer IEEE 802.11p and higher layer IEEE 1609, or a cellular communication protocol, for example. The dedicated communication I/F 7630 typically carries out V2X communication that is a concept including one or more of vehicle-to-vehicle communication, road-to-vehicle (vehicle-to-infrastructure) communication, communication between a mobile body and a home (vehicle-to-home), and vehicle-to-pedestrian communication.

The positioning unit 7640 receives, for example, a global navigation satellite system (GNSS) signal from a GNSS satellite (for example, a global positioning system (GPS) signal from a GPS satellite), executes positioning, and generate location information including the latitude, longitude, and altitude of the vehicle. Note that the positioning unit 7640 may specify the current position by exchanging signals with the wireless access point, or may acquire position information from a terminal such as a mobile phone, PHS, or smartphone having a positioning function.

The beacon reception unit 7650 receives, for example, radio waves or electromagnetic waves transmitted from wireless stations and the like installed on the road, and acquire information such as the current position, traffic jam, traffic regulation, or required time. Note that the function of the beacon reception unit 7650 may be included in the above-mentioned dedicated communication I/F 7630.

The in-vehicle device I/F 7660 is a communication interface that mediates the connection between the microcomputer 7610 and various in-vehicle devices 7760 existing in the vehicle. The in-vehicle device I/F 7660 may establish a wireless connection using a wireless communication protocol such as wireless LAN, Bluetooth (registered trademark), near field communication (NFC), or WUSB (Wireless USB). Furthermore, the in-vehicle device I/F 7660 may establish a wired connection such as a Universal Serial Bus (USB), High-Definition Multimedia Interface (HDMI (registered trademark)), or Mobile High-Definition Link (MHL) via a connection terminal (and a cable if necessary) that is not illustrated. The in-vehicle devices 7760 may include, for example, at least one of a mobile or wearable device owned by a passenger, or information device carried in or attached to the vehicle. Furthermore, the in-vehicle devices 7760 may also include a navigation device that searches for a route to an arbitrary destination. The in-vehicle device I/F 7660 exchanges control signals or data signals with these in-vehicle devices 7760.

The in-vehicle network I/F 7680 is an interface that mediates communication between the microcomputer 7610 and the communication network 7010. The in-vehicle network I/F 7680 transmits and receives signals and the like according to a predetermined protocol supported by the communication network 7010.

The microcomputer 7610 of the integrated control unit 7600 controls the vehicle control system 7000 according to various programs on the basis of information acquired through at least one of the general-purpose communication I/F 7620, the dedicated communication I/F 7630, the positioning unit 7640, the beacon reception unit 7650, the in-vehicle device I/F 7660, or the in-vehicle network I/F 7680. For example, the microcomputer 7610 may calculate a control target value of the driving force generation device, the steering mechanism, or the braking device on the basis of the acquired information inside and outside the vehicle, and may output a control command to the drive system control unit 7100. For example, the microcomputer 7610 may perform cooperative control for the purpose of achieving functions of the advanced driver assistance system (ADAS) including vehicle collision avoidance or impact mitigation, following traveling based on an inter-vehicle distance, vehicle speed maintaining traveling, vehicle collision warning, or vehicle lane departure warning, and the like. Furthermore, the microcomputer 7610 may control the driving force generation device, the steering mechanism, the braking device, or the like on the basis of acquired information around the vehicle, to thereby perform cooperative control for the purpose of autonomous driving or the like to travel autonomously without depending on operation by the driver.

On the basis of information acquired via at least one of general-purpose communication I/F 7620, dedicated communication I/F 7630, positioning unit 7640, beacon reception unit 7650, in-vehicle device I/F 7660, or in-vehicle network I/F 7680, the microcomputer 7610 may generate three-dimensional distance information between the vehicle and an object such as a surrounding structure or a person, and create local map information including peripheral information of the current position of the vehicle. Furthermore, the microcomputer 7610 may predict danger of a vehicle collision, approaching a pedestrian or the like, or entering a closed road on the basis of the acquired information, and generate a warning signal. The warning signal may be, for example, a signal for generating a warning sound or turning on a warning lamp.

The audio image output unit 7670 transmits an output signal of at least one of sound or image to an output device capable of visually or audibly notifying a passenger of the vehicle or the outside of the vehicle of information. In the example of FIG. 14, an audio speaker 7710, a display unit 7720, and an instrument panel 7730 are illustrated as output devices. The display unit 7720 may include, for example, at least one of an on-board display or a head-up display. The display unit 7720 may have an augmented reality (AR) display function. The output device may be a device other than these devices, such as a headphone, a wearable device such as an eyeglass-type display worn by a passenger, and a projector or a lamp. In a case where the output device is a display device, the display device visually displays results obtained by various processing performed by the microcomputer 7610 or information received from other control units in various formats such as a text, an image, a table, and a graph. Furthermore, in a case where the output device is an audio output device, the audio output device converts an audio signal including reproduced voice data, acoustic data, or the like into an analog signal and outputs it audibly.

Note that in the example illustrated in FIG. 14, at least two control units connected via the communication network 7010 may be integrated as one control unit. Alternatively, each individual control unit may include a plurality of control units. Moreover, the vehicle control system 7000 may include another control unit (not illustrated). Furthermore, in the above description, the other control unit may have a part or all of the functions carried out by any of the control units. That is, as long as information is transmitted and received via the communication network 7010, predetermined arithmetic processing may be performed by any control unit. Similarly, a sensor or device connected to any control unit may be connected to another control unit, and a plurality of control units may transmit and receive detection information to and from each other via the communication network 7010.

Note that a computer program for implementing each function of the operation control device (camera control unit 30) according to the present embodiment described with reference to FIGS. 8, 11, 12, and the like can be mounted on any of the control units. Furthermore, a computer-readable recording medium in which such a computer program is stored can be provided. The recording medium is, for example, a magnetic disk, an optical disk, a magneto-optical disk, a flash memory, or the like. Furthermore, the above-described computer program may be distributed via a network, for example, without using a recording medium.

In the vehicle control system 7000 described above, the operation control device (camera control unit 30) according to the present embodiment described with reference to FIGS. 8, 11, 12, and the like can be applied to an integrated control unit 7600 of an application example illustrated in FIG. 14. For example, the operation detection unit 31, the operation response processing unit 32, and the operation determination unit 33 of the operation control device (camera control unit 30) correspond to the microcomputer 7610, the storage unit 7690, and the in-vehicle network I/F 7680 of the integrated control unit 7600. For example, the integrated control unit 7600 detects a first type operation and a second type operation having an operation area common to the first type operation, performs response processing corresponding to the first type operation and the second type operation detected, determines whether the detected second type operation is a valid operation or an invalid operation in a determination period corresponding to that the first type operation has been detected, and thus it is possible to prevent an erroneous operation not intended by the user and improve operability of the operation control device.

For example, in the vehicle control system 7000, the present technology can be applied to operation of changing the mode of transmission. The mode of transmission includes, for example, a well-balanced and efficient normal mode, a fuel consumption priority mode that minimizes fuel consumption, a steering mode that enables direct steering, and the like. By assigning the first type operation and the second type operation to the switching operation to each mode and various operations in the mode, it is possible to prevent an erroneous operation when operating the mode of transmission.

Furthermore, at least a part of the components of the operation control device (camera control unit 30) described with reference to FIGS. 8, 11, 12, and the like may be achieved with a module for the integrated control unit 7600 illustrated in FIG. 14 (for example, an integrated circuit module including one die). Alternatively, the operation control device (camera control unit 30) described with reference to FIGS. 8, 11, 12 and the like may be achieved by a plurality of control units of the vehicle control system 7000 illustrated in FIG. 14.

Note that effects described in the present description are merely examples and are not limited, and other effects may be provided.

Note that the present technology can employ configurations as follows.

(1)

An operation control device including:

an operation detection unit that detects a first type operation and a second type operation having an operation area common to the first type operation;

an operation response processing unit that performs response processing corresponding to the first type operation and the second type operation detected by the operation detection unit; and an operation determination unit that determines whether the second type operation detected by the operation detection unit is a valid operation or an invalid operation in a determination period corresponding to that the operation detection unit has detected the first type operation.

(2)

The operation control device according to (1), in which the second type operation is an operation that has a possibility of being detected by the first type operation.

(3)

The operation control device according to (1) or (2), in which the operation determination unit determines that the second type operation is an invalid operation in the determination period.

(4)

The operation control device according to any one of (1) to (3), in which the second type operation has a plurality of operation types, and in a case where the second type operation is detected in the determination period, the operation determination unit determines whether the second type operation is a valid operation or an invalid operation according to an operation type.

(5)

The operation control device according to any one of (1) to (4), in which the determination period is a period from a timing corresponding to the detection of the first type operation to a lapse of a predetermined time.

(6)

The operation control device according to any one of (1) to (5), in which the determination period is started every time the first type operation is detected.

(7)

The operation control device according to any one of (1) to (7), in which the determination period is variably set according to an operating mode.

(8)

The operation control device according to any one of (1) to (7), in which in a certain operating mode, processing of the operation determination unit is not performed.

(9)

The operation control device according to any one of (1) to (8), in which in an operating mode in which an image is displayed according to an operation, the first type operation is an operation to change the displayed image, the second type operation is an operation different from the first type operation, and the operation determination unit determines that the second type operation is an invalid operation in the determination period.

(10)

The operation control device according to any one of (1) to (9), in which in an operating mode in which it is possible to select a focus area of an imaging device on a display screen, the first type operation is an operation of moving a specified focus area among a plurality of focus areas in one of up-down directions or left-right directions, the second type operation is an operation of moving the specified focus area among the plurality of focus areas in the other of the up-down directions or the left-right directions, and the operation determination unit determines that the second type operation is an invalid operation in the determination period.

(11)

The operation control device according to any one of (1) to (10), in which in an operating mode in which it is possible to select a menu on a display screen, the first type operation is an operation of moving a selection area specified among a plurality of menus in one of up-down directions or left-right directions, the second type operation is an operation of moving the selection area specified among the plurality of menus to one of the other of the up-down directions or the left-right directions, and the operation determination unit determines that the second type operation is an invalid operation in the determination period.

(12)

The operation control device according to any one of (1) to (11), in which when a first mode is set in which an image to be reproduced is selected according to an operation, the determination period is set longer than when a second mode is set in which it is possible to select a focus area of an imaging device on a display screen.

(13)

The operation control device according to any one of (1) to (12), in which the operation detection unit detects the first type operation and the second type operation from a common control.

(14)

The operation control device according to (13), in which
the control is a control wheel,
the first type operation is an operation of rotating the control wheel, and
the second type operation is an operation of pressing the control wheel.

(15)

The operation control device according to (13), in which
the control is a touch control that detects a contact operation by the user, and
the first type operation and the second type operation are contact operations with the touch control, the contact operations having different operation types from each other.

(16)

An imaging device including:

an operation detection unit that detects a first type operation and a second type operation having an operation area common to the first type operation;

an operation response processing unit that performs response processing corresponding to the first type operation and the second type operation detected by the operation detection unit; and an operation determination unit that determines whether the second type operation detected by the operation detection unit is a valid operation or an invalid operation in a determination period corresponding to that the operation detection unit has detected the first type operation.

(17)

An operation control method including:

detecting a first type operation and a second type operation having an operation area common to the first type operation and performing response processing corresponding to the first type operation and the second type operation detected; and determining whether the detected second type operation is a valid operation or an invalid operation in a determination period corresponding to that the first type operation has been detected.

REFERENCE SIGNS LIST

1 Imaging device
30 Camera control unit
31 Operation detection unit
32 Operation response processing unit
33 Operation determination unit
FT Determination period
60 Focus area
110W Control wheel
110a to 110d Button

The invention claimed is:

1. An operation control device, comprising:
a processor configured to:
detect a first type operation and a second type operation having an operation area common to the first type operation;
perform response processing corresponding to the first type operation and the second type operation;
set a determination period to be longer in a first mode of an imaging device than in a second mode of the imaging device, wherein
in the first mode, an image to be reproduced is selectable based on a specific operation,
in the second mode, a focus area of the imaging device is selectable on a display screen, and
the determination period corresponds to the detection of the first type operation; and
determine the second type operation is one of a valid operation or an invalid operation in the determination period.

2. The operation control device according to claim 1, wherein the second type operation is an operation that has a possibility of being detected by the first type operation.

3. The operation control device according to claim 1, wherein the processor is further configured to determine the second type operation is the invalid operation in the determination period.

4. The operation control device according to claim 1, wherein
the second type operation has a plurality of operation types, and
in a case where the second type operation is detected in the determination period, the processor is further configured to determine the second type operation is one of the valid operation or the invalid operation based on an operation type of the plurality of operation types.

5. The operation control device according to claim 1, wherein the determination period is a period from a timing corresponding to the detection of the first type operation to a lapse of a specific.

6. The operation control device according to claim 1, wherein the determination period is started every time the first type operation is detected.

7. The operation control device according to claim 1, wherein the determination period is variably set based on an operating mode of the imaging device.

8. The operation control device according to claim 1, wherein in a certain operating mode of the imaging device, the determination is not performed.

9. The operation control device according to claim 1, wherein
in the first mode in which the image is displayable on the display screen based on the specific operation,
the first type operation is an operation to change the displayed image,
the second type operation is an operation different from the first type operation, and
the processor is further configured to determine the second type operation is the invalid operation in the determination period.

10. The operation control device according to claim 1, wherein
in the second mode in which the focus area of the imaging device is selectable on the display screen,
the first type operation is an operation to move a specified focus area among a plurality of focus areas in up-down directions,
the second type operation is an operation to move the specified focus area among the plurality of focus areas in left-right directions, and
the processor is further configured to determine the second type operation is the invalid operation in the determination period.

11. The operation control device according to claim 1, wherein
in an operating mode of the imaging device in which a menu is selectable on the display screen,
the first type operation is an operation to move a selection area specified among a plurality of menus in up-down directions,
the second type operation is an operation to move the selection area specified among the plurality of menus in left-right directions, and
the processor is further configured to determine the second type operation is the invalid operation in the determination period.

12. The operation control device according to claim 1, wherein the processor is further configured to detect the first type operation and the second type operation from a common control.

13. The operation control device according to claim 12, wherein
the common control is a control wheel,
the first type operation is an operation to rotate the control wheel, and
the second type operation is an operation to press the control wheel.

14. The operation control device according to claim 12, wherein
the common control is a touch control that detects a contact operation by a user, and
the first type operation and the second type operation are contact operations with the touch control, each of the contact operations having different operation types.

15. An imaging device, comprising:
a processor configured to:
detect a first type operation and a second type operation having an operation area common to the first type operation;
perform response processing corresponding to the first type operation and the second type operation;
set a determination period to be longer in a first mode of the imaging device than in a second mode of the imaging device, wherein
in the first mode, an image to be reproduced is selectable based on a specific operation,
in the second mode, a focus area of the imaging device is selectable on a display screen, and
the determination period corresponds to the detection of the first type operation; and
determine the second type operation is one of a valid operation or an invalid operation in the determination period.

16. An operation control method, comprising:
detecting a first type operation and a second type operation having an operation area common to the first type operation;
performing response processing corresponding to the first type operation and the second type operation detected;
setting a determination period to be longer in a first mode of an imaging device than in a second mode of the imaging device, wherein
in the first mode, an image to be reproduced is selectable based on a specific operation,
in the second mode, a focus area of the imaging device is selectable on a display screen, and
the determination period corresponds to the detection of the first type operation; and
determining the detected second type operation is one of a valid operation or an invalid operation in the determination period.

* * * * *